United States Patent [19]
Ward et al.

[11] Patent Number: 5,536,985
[45] Date of Patent: Jul. 16, 1996

[54] COMPOSITE ARMATURE ASSEMBLY

[75] Inventors: Robert W. Ward; Sam B. Parker, both of Anderson; David A. Score, Shirley, all of Ind.

[73] Assignee: General Motors Corporation, Detroit, Mich.

[21] Appl. No.: 240,047

[22] Filed: May 9, 1994

[51] Int. Cl.$^6$ .................................................. H02K 15/06
[52] U.S. Cl. ............................................. 310/44; 310/179
[58] Field of Search .............................. 310/44, 177, 42, 310/43, 179; 336/233

[56] References Cited

U.S. PATENT DOCUMENTS

| | | | |
|---|---|---|---|
| 1,789,477 | 1/1931 | Roseby | 252/62.54 |
| 1,850,181 | 3/1932 | Roseby | 148/104 |
| 2,232,352 | 2/1941 | Verweij et al. | 91/68 |
| 4,071,788 | 1/1978 | Martin et al. | 310/42 |
| 4,352,897 | 10/1982 | Ogata et al. | 523/220 |
| 4,456,844 | 6/1984 | Yamamoto et al. | 310/87 |
| 4,496,866 | 1/1985 | Yamamoto et al. | 310/87 |
| 4,622,516 | 11/1986 | Hearn et al. | 324/163 |
| 4,651,039 | 3/1987 | Yamamoto et al. | 310/87 |
| 4,947,065 | 8/1990 | Ward et al. | 310/44 |
| 5,105,115 | 4/1992 | Shinryo et al. | 310/258 |
| 5,191,250 | 3/1993 | Kobayashi | 310/261 |
| 5,477,092 | 12/1995 | Tarrant | 310/43 |

FOREIGN PATENT DOCUMENTS

| | | | |
|---|---|---|---|
| 91/06146 | 5/1991 | France | 310/177 |
| 2833899 | 2/1979 | Germany | 310/44 |
| 63-23523 | 1/1988 | Japan | . |
| 511665-A | 3/1976 | U.S.S.R. | . |
| 158013 | 6/1920 | United Kingdom | 310/44 |

OTHER PUBLICATIONS

Properties and Applications of Soft Magnetic Powder Composites; A. Kordecki, B. Weglinski, & J. Kaczmar; Powder Metallurgy 1982, vol. 25, No. 4; pp. 201–208 month unknown.

Effect of $Fe_3P$ Addition on Magnetic Properties and Structure of Sintered Iron; B. Weglinski & J. Kaczmar; Powder Metallurgy 1980, No. 4; pp. 201–216 month unknown.

Hoeganaes Technical Data (A New Higher Compressibility Iron Powder); Ralph H. Hershberger & Patrick J. McGeehan; Hoeganaes Corp., Riverton, NJ date unknown.

Primary Examiner—Steven L. Stephan
Assistant Examiner—Judson H. Jones
Attorney, Agent, or Firm—Anthony Luke Simon

[57] ABSTRACT

A method of manufacturing an armature for a DC motor comprising the steps of: (a) retaining a plurality of armature conductors pre-positioned in a pre-mold position; (b) placing the armature conductors in a mold; (c) adding to the mold a predetermined quantity of soft-magnetic particles, each soft-magnetic particle coated with a non-magnetic material, wherein said particles surround at least a portion of each of the conductors; (d) applying pressure to the mold to affect a compaction molding of the coated soft magnetic particles into a composite structure, wherein the particles and the non-magnetic material form a composite structure armature core substantially encapsulating the conductors within the armature core.

9 Claims, 18 Drawing Sheets

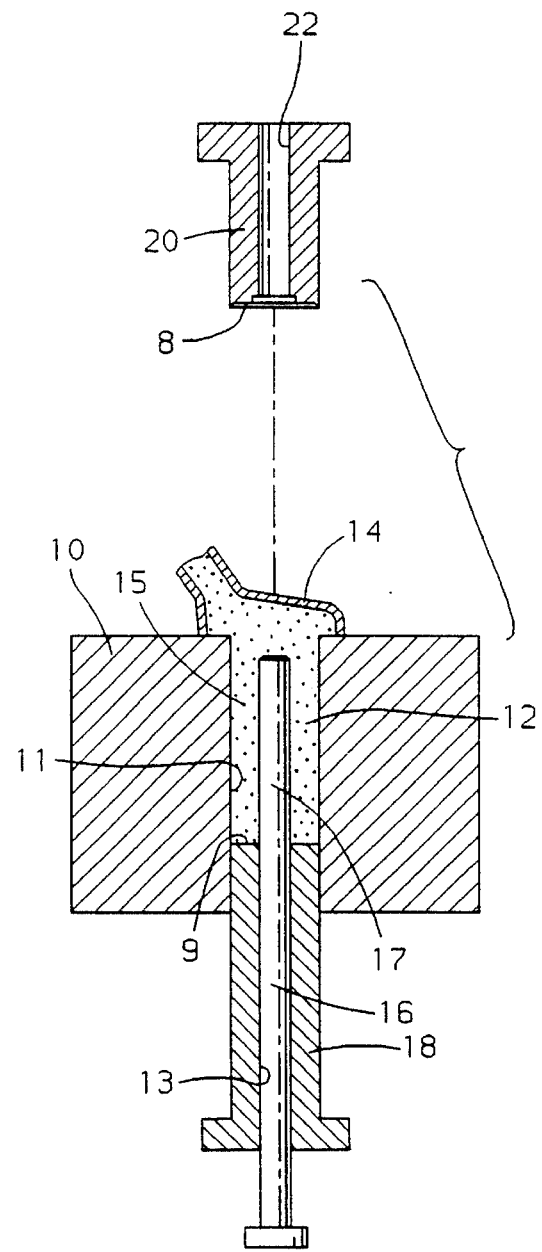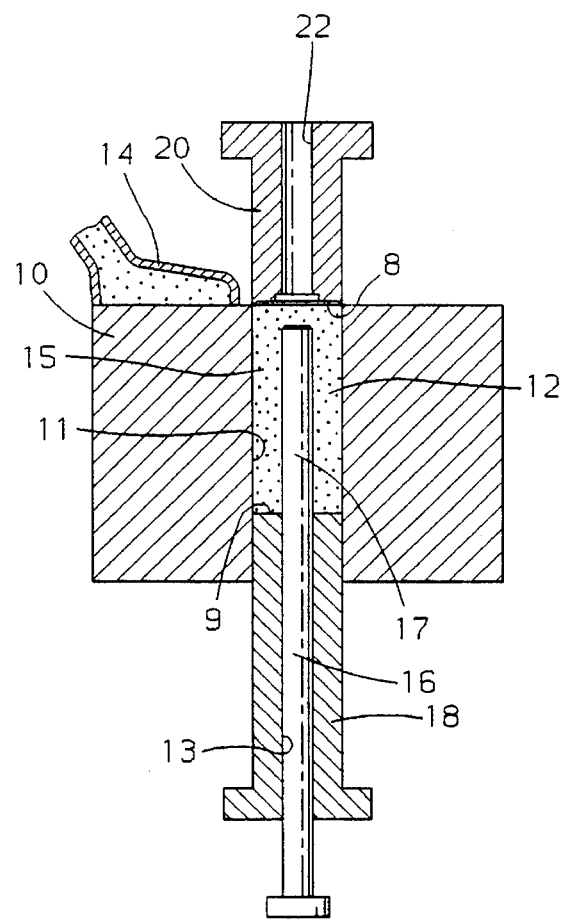
FIG. 1A
FIG. 1B

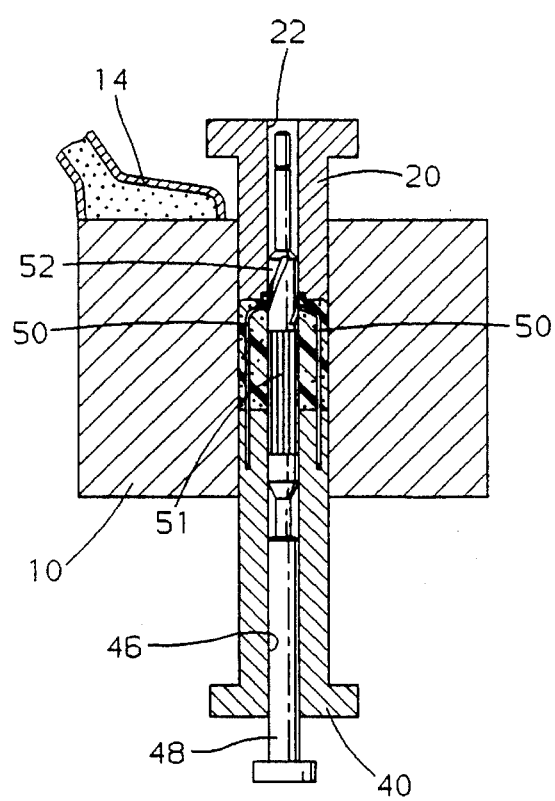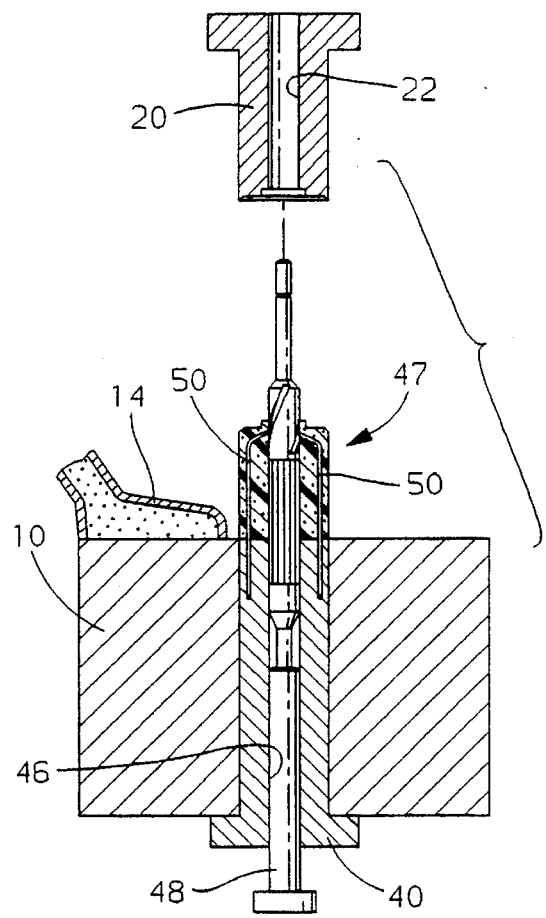
FIG. 3E
FIG. 3F

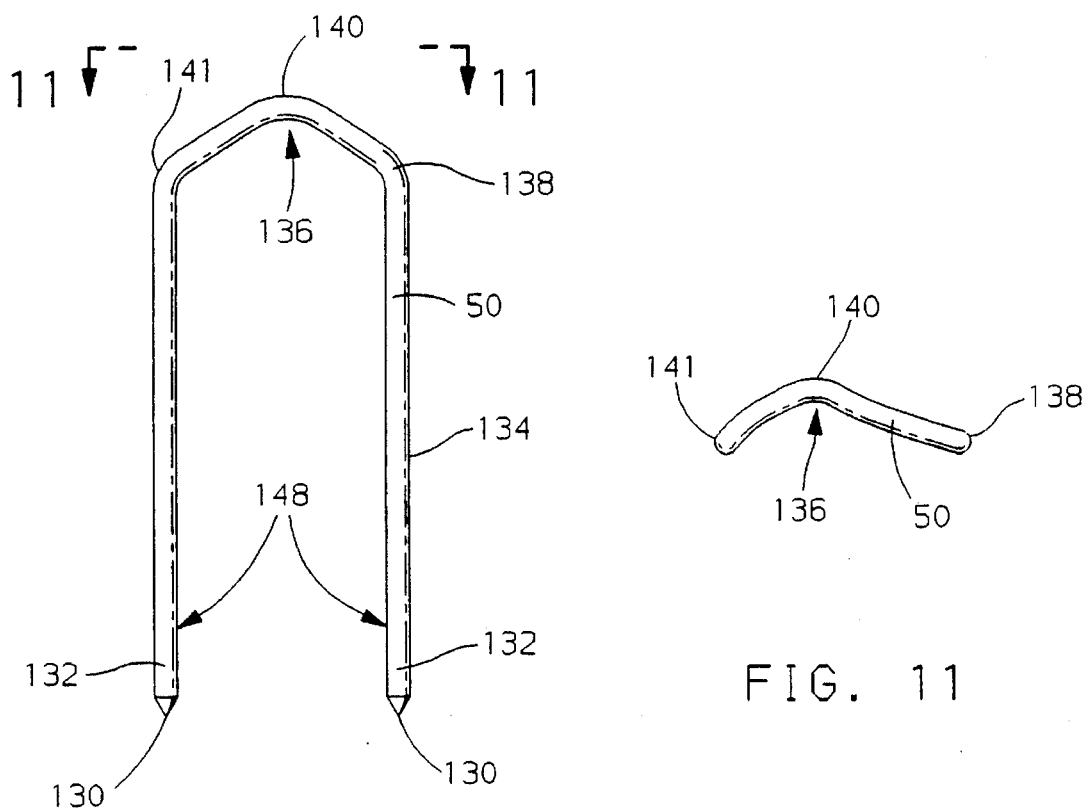
FIG. 10
FIG. 11
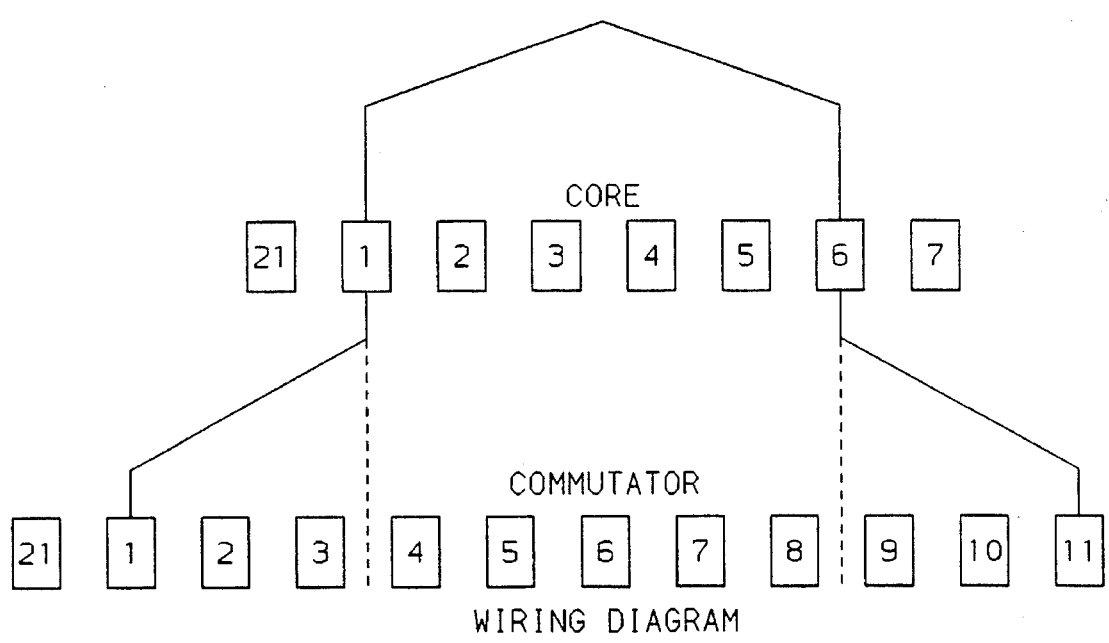
FIG. 12

COMPOSITE ARMATURE ASSEMBLY

The subject of this invention is related to the subject of United States patent application, Ser. No., 08/153,853, filed Nov. 18, 1993, assigned to the assignee of this invention and having a disclosure incorporated herein by reference.

This invention relates to an armature assembly for an electric motor including a molded composite structure.

BACKGROUND OF THE INVENTION

Internal combustion engine cranking motors, such as the type that are often found in automotive vehicles, are typically high torque DC motors.

Armatures for DC motors including high torque motors used as cranking motors for internal combustion engines typically comprise a shaft, a stack of thin steel sheets called laminations, a commutator and conducting wires that are usually copper. In a known method, a lamination stack of a specific length is assembled and the motor shaft is mounted into a hole or bore axially centered in the lamination stack. Conducting wires are assembled or wound in a series of lamination slots. The commutator is then pressed onto the shaft and the conducting wires are attached to the appropriate commutator bars, completing assembly of the motor armature.

SUMMARY OF THE PRESENT INVENTION

Advantageously, this invention provides a new structure for an armature of a motor suitable for use in high torque environments, such as for automotive cranking motors.

Advantageously, this invention provides an armature structure that eliminates the need for a lamination stack as part of the armature.

Advantageously, this invention provides an armature structure that can be constructed as an integrally molded part.

Advantageously, this invention provides an armature structure for a DC motor that includes a composite material that serves the same function as the thin steel lamination stack in prior armatures.

Advantageously, the armature of this invention comprises a one-piece compacted structure that replaces the many pieces of stamped steel lamination typically used in an armature assembly.

Advantageously, this invention provides an armature assembly for a motor that is manufactured without need of the steps of stamping, stacking and assembling a lamination stack.

Advantageously, this invention provides an armature structure capable of achieving the advantages herein recited comprising a compaction molded cylindrical body comprising a plurality of space separated soft magnetic particles and a nonmagnetic binder, the cylindrical body comprising an axial cylindrical opening adapted for receiving a motor shaft and a plurality of conductor openings, parallel to the axial cylindrical opening, adapted for receiving a plurality of insulated armature conductors.

Advantageously, this invention provides an armature structure capable of achieving the advantages herein recited comprising a plurality of substantially U-shaped insulated conductors and a composite core comprising a plurality of space-separated soft magnetic particles in a non-magnetic binder wherein the substantially U-shaped conductors are integrally molded into the composite core and spaced so as to be suitable for the creation of armature magnetic fields in a DC motor.

Advantageously, this invention comprises a method of manufacturing an armature for a DC motor comprising the steps of retaining a plurality of insulated armature conductors in a pre-mold position, placing the armature conductors in a mold, adding to the mold a predetermined quantity of soft-magnetic particles each coated with a non-magnetic material wherein said particles surround at least a portion of each of the conductors, applying heat and pressure to the mold to cause the non-magnetic material to achieve at least a partially fluid state, cooling said mold wherein the particles and the non-magnetic material form a composite structure armature core wherein the conductors are molded in place within the armature core and wherein the armature core and conductors comprise an integrally molded one-piece structure.

A more detailed description of this invention, along with various embodiments thereof, is set forth further below.

BRIEF DESCRIPTION OF THE DRAWINGS

FIGS. 1a, 1b, 1c, 1d, 1e and 1f illustrate a first example method of constructing an armature according to this invention.

FIGS. 3a, 3b, 3c, 3d, 3e and 3f illustrate a second example method of constructing an armature according to this invention.

FIGS. 10 and 11 illustrate an example armature conductor according to this invention.

FIG. 12 illustrates an example conductor map according to this invention.

DETAILED DESCRIPTION OF THE INVENTION

Figure 1C:
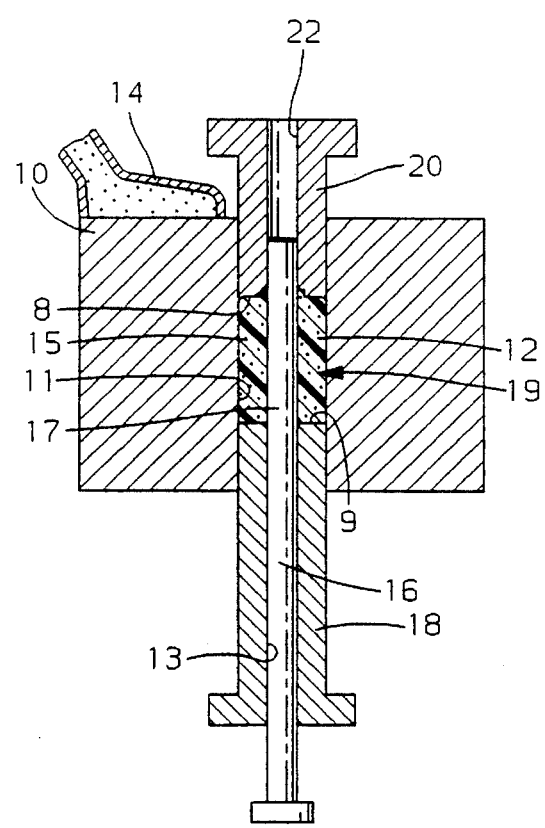

This invention provides an armature for an electric motor comprising a core that replaces a lamination stack used in conventional armature assemblies. The core is made of a composite material, which is defined as a material having a plurality of soft magnetic particles, for example iron particles, coated with a non-magnetic binder such as a thermoplastic or resin in which the particles are space-separated and bound together by the non-magnetic binder.

In general, the armature according to this invention is constructed according to this invention by placing a predetermined quantity of soft magnetic particles coated with a non-magnetic binder into a compaction mold and compaction molding the particles to form the armature core. The armature also includes a shaft to which the core is mounted and plurality of insulated conductors that are used in the final motor assembly to create the magnetic fields that create motive force in a manner well known to those skilled in the art.

EXAMPLE 1

Referring to FIGS. 1a–f, a die body 10, having a cylindrical cavity 12, receives a predetermined quantity of particles 15 through feed shuttle 14, which particles are used in the compaction molding process to form the compaction molded composite core according to this invention. Feed shuttle 14 is adapted to slide across the die body 10 so that, when in the position shown in FIG. 1a, particles 15 may be fed into the cavity 12 and when in the position shown in FIG. 1b, no particles flow from the feed shuttle.

The process of filling the die body cavity 12 with the compaction powder is known as charging and may be carried out as follows. Lower punch 18 is raised substantially to the top of the cavity 12 and, as particles 15 are fed into the portion of cavity 12 above the top of lower punch 18, lower punch 18 is gradually lowered to help "draw" the particles into cavity 12.

Construction of soft magnetic structures, according to this invention, follows the basic steps of known construction of composite iron powder structures (see, for example, U.S. Pat. No. 5,947,065, parts of which are reproduced below) with additional improvements, according to this invention, to provide the resultant structure according to this invention. Portions of the following description also appear in the above-mentioned United States patent application, Ser. No. 08/153,853, assigned to the assignee of this invention. The particles used in the compaction molding process comprise particles of iron powder or other ferromagnetic powder that, in the end structure, are bound together by an insulating material, typically a thermoplastic material. The iron powder in the structure, according to this invention, may be Hoeganaes 1000C iron powder. The particle size of this powder based on the U.S. standard sieve analysis is shown in the following table.

| Sieve | Percent |
| --- | --- |
| +60 | 1 |
| −60/+100 | 14 |
| −100/+325 | 70 |
| −325 | 15 |

The particle sizes of the iron powder range from about 44 to 250 microns, according to this sieve analysis. However, a very small percentage of the powder may have a particle size as small as 10 microns. The powder is about 99.7% Fe, 0.003% C, 0.0005% N, 0.006% S, and 0.004% P. The thermoplastic material may be an amorphous thermoplastic polyethermide resin, an example of which is a General Electric "ULTEM" (Registered Trademark General Electric) resin. The thermoplastic material may be replaced by a thermoset material, or another alternative material capable of performing similar functions.

To prepare powder for molding, the particles of iron powder are coated with a thin layer of thermoplastic material. One way of accomplishing this is to mix the thermoplastic material with a solvent to provide a liquid material. Another way to achieve the liquid material is with heat, or with the use of component liquid materials.

The powder is then blown by air up through a vertical tube and, at the same time, the liquid material is sprayed on the powder to coat the powder. The coated powder falls outside the tube and is directed back into an inlet of the tube where it is blown up again and coated again. After a number of passes through the tube, the particles are all coated to the extent desired. The solvent evaporates or is recovered during this process. When the iron particles have been completely coated, the quantity of the coated particles may be preheated and placed in a heated die body, and/or the die body may be preheated.

During a preferred implementation of the compaction molding described below, thermoplastic or thermoset material is heated sufficiently to cause it to melt and bond the particles together. Example parameters are as follows: compaction mold pressure of 50 tsi (tons per square inch), heating temperature of 650 degrees Fahrenheit.

In the final molded state of the soft magnetic structure, the thermoplastic material is bonded to the outer surface of each metal particle so that the particles are insulated from each other by thin layers of thermoplastic material. Further, the thermoplastic material bonds all the particles together to form the composite structure. It will be appreciated that, since the particles are separated by the thermoplastic material, there are gaps formed between the particles. These gaps act like air gaps, since the thermoplastic material separating the particles has about the same permeability as air. This air-gap effect increases resistivity and, consequently, reduces eddy current loses.

To provide output performance or power that is comparable to a structure that is formed of laminations of steel, the proportions of iron powder and thermoplastic material should fall within certain ranges. Thus, by weight, the structure should be 95 to 99.9% iron powder and 5 to 0.1% thermoplastic. Since about 1% by weight of thermoplastic equal to about 4% by volume, a core that is 99% iron powder by weight and 1% thermoplastic by weight would be in the range of approximately 96% iron powder by volume and 4% thermoplastic material by volume, depending upon the thermoplastic (or thermoset) material used. Performance of the iron particles can be altered if the iron particles have a phosphorous coating. Thus, the iron powder can be coated with a phosphate or phosphorous and this phosphorus is then over-coated with the thermoplastic material. When using phosphorus, the proportion should be, by weight, 0.05% to 0.5% phosphorus.

Actuators used in the mechanical compaction molding processes described below may be hydraulic, pneumatic, cam operated mechanical, or any suitable type of actuator capable of providing the required compaction force, and such actuators are readily available to and easily implemented by those skilled in the art.

Die bodies may be preheated, i.e., to a temperature up to 650 degrees Fahrenheit to achieve the desired heating of the composite material. Note the heating temperatures can vary greatly, depending upon the characteristics of thermoplastic or thermoset material used. For example, a thermoset material has been successfully used with heating temperatures as low as 70 degrees Fahrenheit. Lower and higher temperatures will be achieved as new materials are tried.

The material is compacted at 50 tsi for up to 30 seconds. Good results have also been achieved at 45 and 60 tsi.

The step of preheating or otherwise heating the die need not be utilized. However, the resulting composite structure has improved mechanical properties when the die is heated or preheated.

Referring again to FIG. 1a, lower punch 18 is located at the bottom of die cavity 12 and is adapted in a manner well known to those skilled in the art to slide vertically within the cylindrical cavity 12. Lower punch 18 has a central axial bore 13 within which is fitted a core rod 16. Core rod 16 is adapted so that it may slide in the vertical directions within the axial bore 13 of lower punch 18, independently of the position of lower punch 18. Core rod 16 has an extending portion 17 that extends into the cavity 12 of die body 10.

Referring now also to FIG. 1b, after a predetermined amount of composite powder 15 is added to the cavity 12 of die body 10, feed shuttle 14 is moved horizontally across the top of die body 10 so that it can no longer provide powder to the cavity 12 and so that the composite powder is prevented from escaping the feed shuttle 14. Upper punch 20 is lowered into the position shown and has a circular cylindrical shape allowing upper punch 20 to slidably engage the walls 11 of cylindrical die cavity 12. As shown in FIG. 1b, the composite powder 15 settles in the die cavity 12 and surrounds a length of extending portion 17 of core rod 16.

Referring now to FIG. 1c, the upper punch 20 is lowered into the cavity 12 and force is applied through a suitable manner, as described above, to the upper and lower punches 20 and 18. For example, the force may be provided from a hydraulic actuator or an electric motor driven actuator.

The vertical forces on the punches 18 and 20 are on the order of 45–60 tons p.s.i. As upper punch 20 is lowered, the top of core rod 16 slidably engages with the central axial bore 22 of upper punch 20. The shape of the cylindrical walls of cavity 12 and the top surface 9 and the lower surface 8 of the lower and upper punches 18 and 20, respectively, determine the shape of the armature core being compaction molded. For purposes of this example, a substantially circular cylindrical shape is all that is required.

Figure 1D:
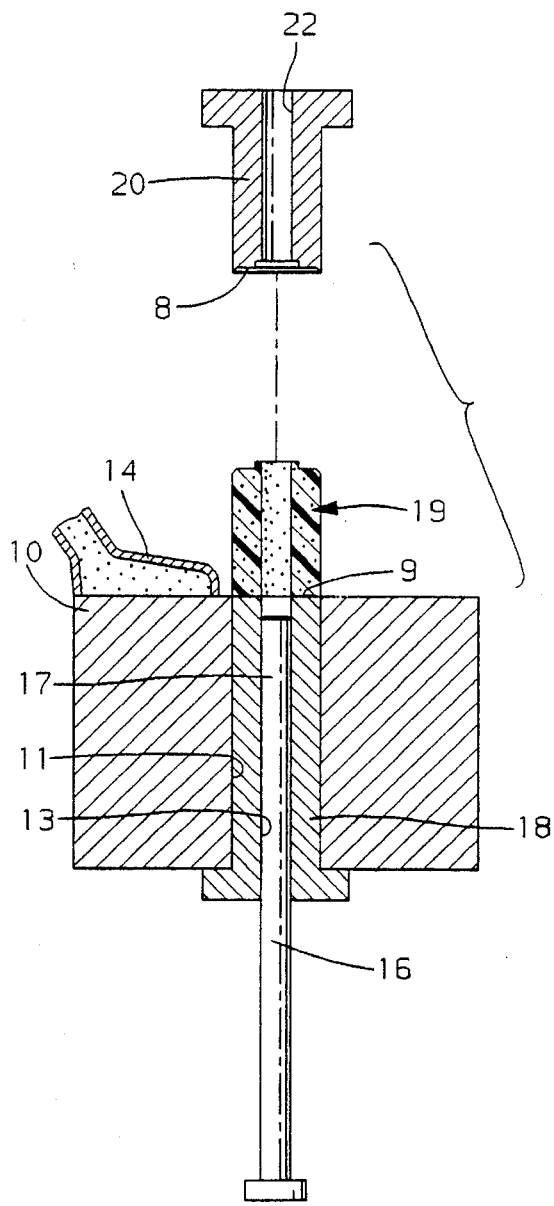

During the application of pressure by the force on the compaction punches 18 and 20, the die mold 10 is heated (or, alternatively, was preheated) to a temperature at which the nonmagnetic binder on the particles of the compaction powder 15 becomes at least partially fluid. Application of the heat, for example, up to 650° F., depending on the material used in the nonmagnetic binder, and the above-mentioned pressure for a time up to 30 seconds affects a compaction molding of the powder 15 into the armature core. After the compaction molding, upper punch 20 is raised clear of the die body 10 and lower punch 18 is raised to move the core 19 to the top of die body 10, as shown in FIG. 1d, and to disengage the compaction molded core 19 from the core rod 16.

Figure 1E:
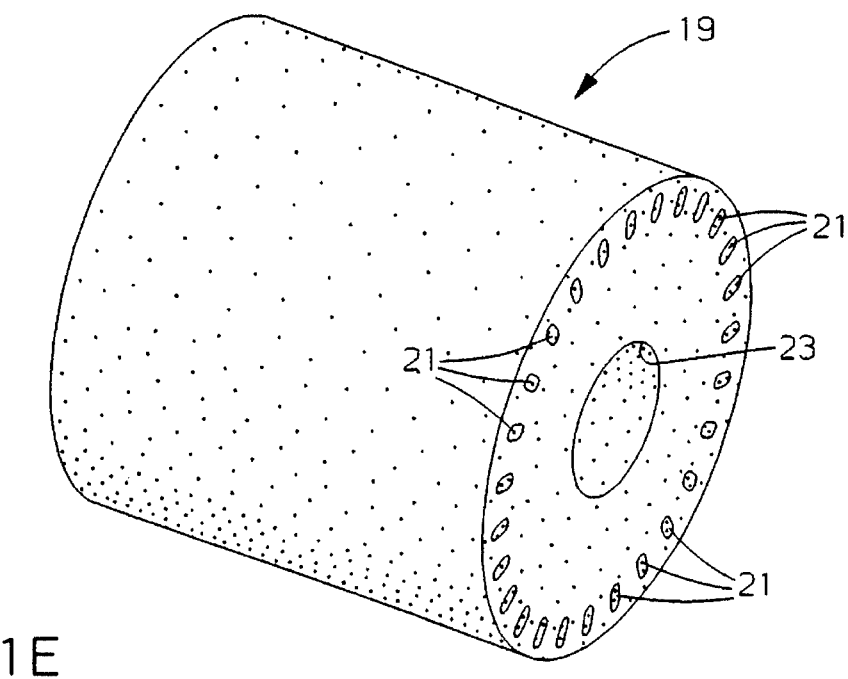
Figure 1F:
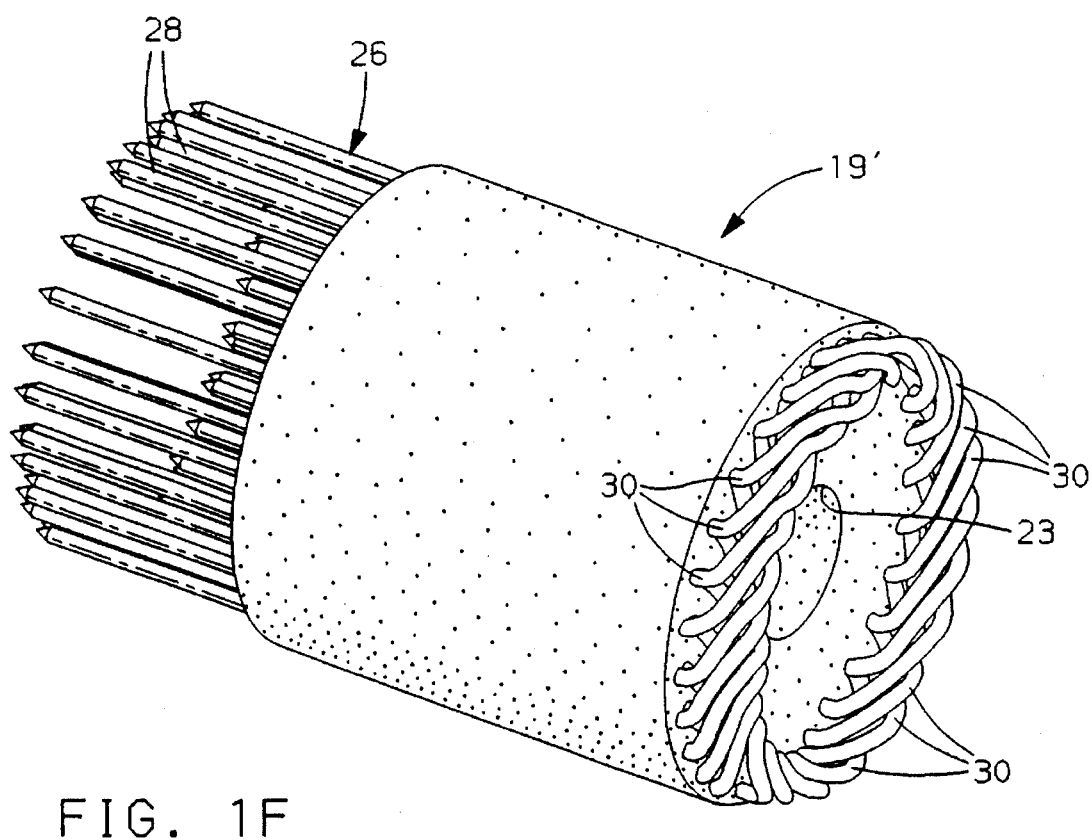

Referring to FIGS. 1e and 1f, a series of U-shaped conductors 26 having closed ends 30 and extending leads 28 are provided in a series of holes 21 in the core 19. The holes 21 may be drilled or molded into the core 19 parallel to the axial direction in a circular pattern around the central axis of the core 19. The core 19 shown has a central axial bore or opening 23 resulting from core rod 16 in which bore 23 the armature shaft will be inserted to complete the armature assembly in a manner easily achieved by one skilled in the art. Preferably, while the armature is still hot, the shaft is pressed into the armature. As the armature cools, it shrinks around the shaft to achieve a firm fit. Alternatively, the shaft may be press fit into the armature after the armature has cooled.

Referring to FIG. 1f, an example armature assembly according to this invention, not including the armature shaft and commutator, is shown as reference 19' and includes the armature conductors having leads 28 extending from one end of the core 19' and the closed portions 30 at the other end of core 19'. A shaft and commutator (not shown) are assembled to the core 19' (shown in 1f) in a manner well known to those skilled in the art to complete the armature. The completed armature can then be easily implemented into a DC motor assembly according to known manners of construction of DC motors. Example shapes and patterns for location of the armature conductors 26 are explained further below with reference to FIGS. 9, 10 and 11.

Thus, accordingly, this invention comprises an armature structure comprising a compaction molded cylindrical body 19' comprising a plurality of space separated soft magnetic particles and a nonmagnetic binder, the cylindrical body comprising an axial cylindrical opening (reference 23) adapted for receiving a motor shaft and a plurality of conductor openings or holes 21, parallel to the axial cylindrical opening 23, adapted for receiving a plurality of armature conductors 50.

EXAMPLE 2

Figure 2:
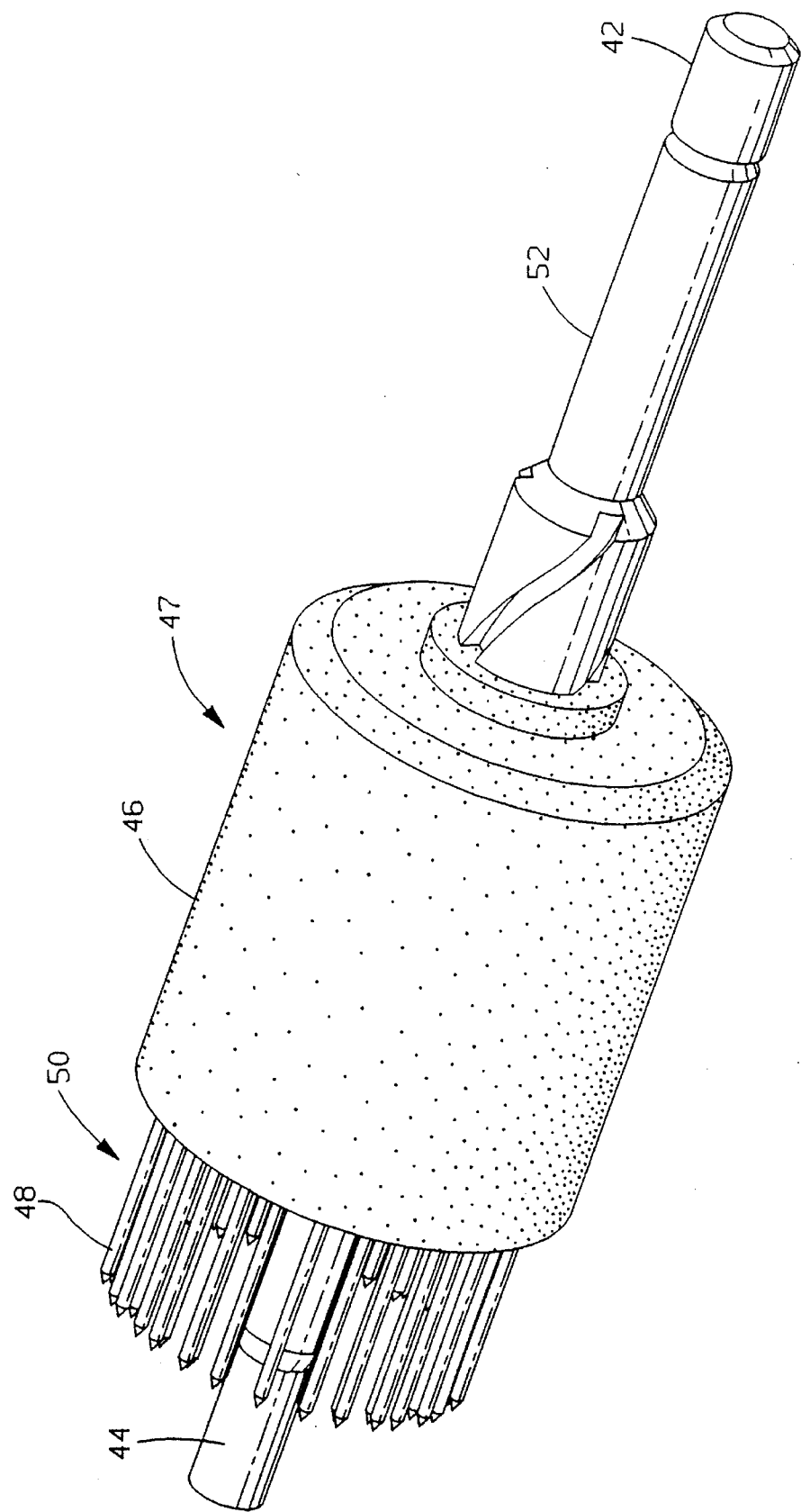
FIG. 2 illustrates an example armature structure according to this invention.

Referring now to FIG. 2, another example motor armature according to this invention is shown. The armature 47 shown includes a molded core 46 in which is integrally molded conductors 50, such that a majority of the body of each conductor 50 is molded into and encased within core 46. Core 46 retains conductors 50 in place by compaction molding core 46 around the conductors 50. Leads 48 extend from the core 46 and are assembled to a commutator (not shown) in a manner well known to those skilled in the art.

The armature 47, shown, core 46 and conductors 50 are integrally molded and molded onto the shaft 40 in a single molding process. The shaft 40 has a portion (not shown) around which the core 46 is molded and has a first bearing end 44 for mounting the armature into a motor housing (not shown) and a second bearing end 42 also for mounting the armature into a motor housing.

Referring now to FIGS. 3a–f, an example method of constructing the armature shown in FIG. 2 is illustrated.

Figure 3A:
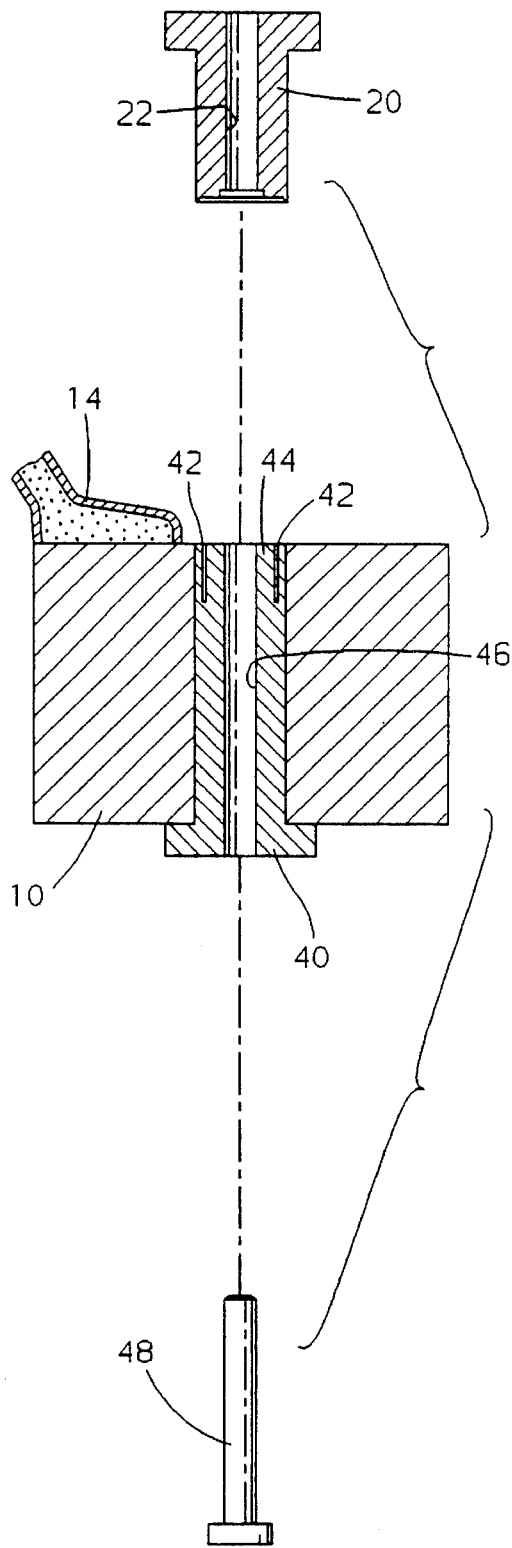

Starting with the step shown in FIG. 3a, a die body 10 retains a lower punch 40 having an upper end 44 and an axial bore 46. Radially disposed in a circular pattern about the axis of lower punch 40 are a series of retaining receptacles 42, whose function will be explained below.

Figure 3B:
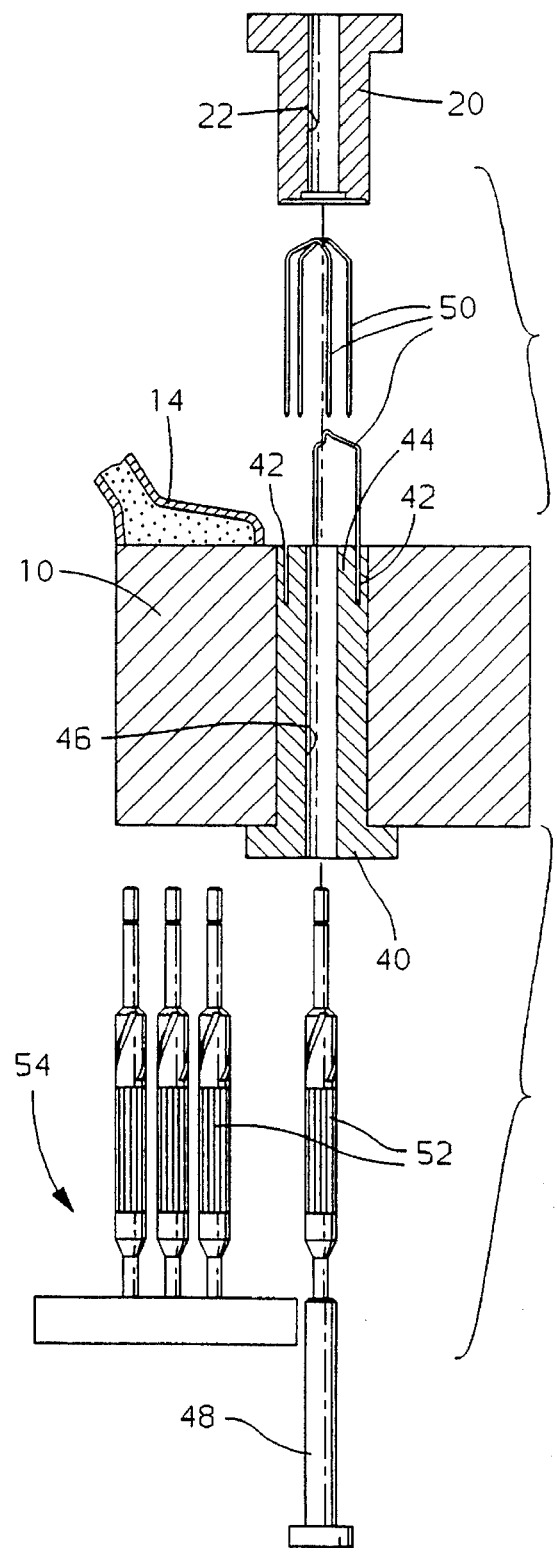

Referring to FIG. 3b, with the compaction molding apparatus placed in the position shown, a series of conductors 50 are loaded into the retaining receptacles 42 in the end 44 of lower punch 40. The conductors 50 are U-shaped, in general, and may be of the type explained below with reference to FIGS. 9–11. The receptacles 42 preposition conductors 50, retaining each of the conductors 50 in their pre-mold positions.

The relative location of the conductors 50 is generally that of the final position desired for the conductor, examples of which positions are described below and variations of which examples will be readily apparent to those skilled in the art. During the compaction process, however, there may be some radial movement of the conductors 50. Therefore, it is desirable that the conductors 50 be placed radially outward of their desired final position by a predetermined distance, for example, 0.25 inches, to account for the radially inward movement that will occur during the compaction molding process. It will be seen that the retaining slots 42 do not allow for radial movement of the ends of conductors 50 and that this tends to cause bending, during the compaction molding, of the conductors 50 where the conductors 50 extend from retaining slots 42. This bending of the conductors during the compaction molding is acceptable.

Also illustrated in FIG. 3*b*, a shaft 52 is loaded from a magazine 54 onto a loading rod 48.

Figures 3C, 3D:
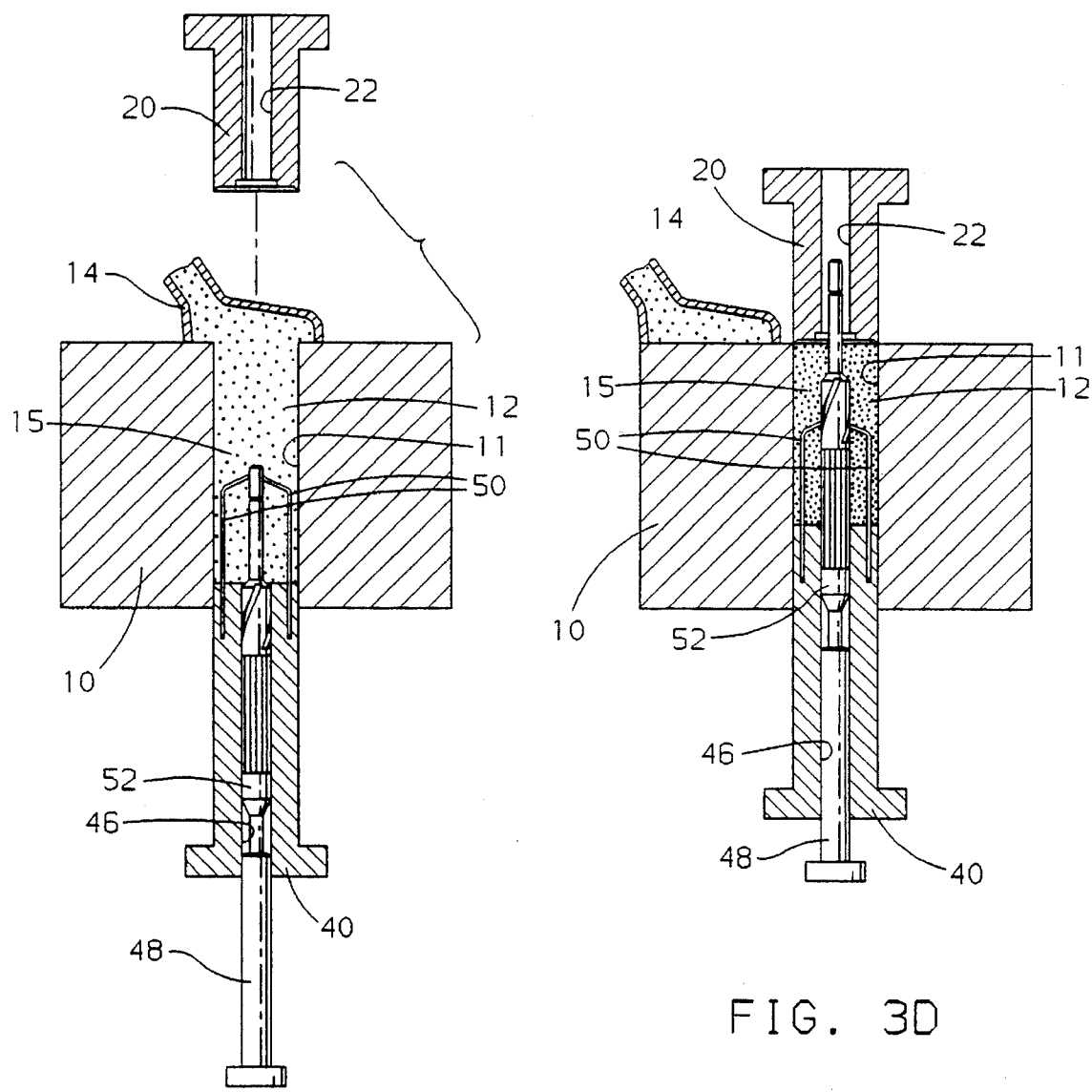

Referring now to FIG. 3*c*, the lower punch 40 is moved downward in the vertical direction and the core rod 48 is moved upward so that the shaft 52 passes through the central bore 46 of lower punch 40 and moves into the cavity 12 of the die body 10. Also illustrated in FIG. 3*c*, the feed shuttle 14 moves into the position shown, where the open bottom of the feed shuttle 14 is over the cavity 12 of the die body 10 allowing a predetermined quantity of compaction powder 15 to be disposed into the cavity 12 from the feed shuttle 14 to accomplish charging of the cavity 12.

Referring now to FIG. 3*d*, the feed shuttle 14 has been moved away from the opening to cavity 12 and is again in position where it is sealed against the top of die body 10. Upper punch 20 is lowered into position and engages the cylindrical wall 11 of cavity 12 of die body 10. Core rod 14 is raised higher, raising armature shaft 52 so that the grooved portion 51 is properly centered within the conductors 50 and the accumulation of compaction powder 15 in the die cavity 12. Grooved portion 51 of the armature shaft 52 is included on the shaft to providing a feature increasing the bonding strength of the resultant compaction molded core 46 to the shaft 52. The upper end 42 of the shaft 52 slidably engages within axial bore 22 of upper punch 20 as upper punch 20 is lowered into position.

Referring now to FIG. 3*e*, the die body 10 is heated (or, alternatively was preheated) and the compaction punches 20 and 40 are moved in opposite vertical directions to apply pressure in the range of 45–60 tons p.s.i. on the compaction powder 50 within the die cavity 12 surrounding the proper portion 51 of armature shaft 52 and surrounding a majority of each conductor 50 (all of each conductor 50 except the extending leads 48). This process causes the formation of a solid core that is compaction molded and retains the conductors 50 molded in place. The resulting core is attached to the shaft 52 by flow of the compaction powder and binder into the grooves of portion 51 of the shaft 52. Thus the linear axial length of the shaft 52 coextensive with grooved portion 51 is encapsulated within the core 46.

After the part is compacted, upper punch 20 is raised as shown in FIG. 3*f* and lower punch 40 is raised to bring the resultant armature assembly 47 to the top of the die 10, from which it may be removed to provide the resultant structure shown in FIG. 2.

Thus, as is apparent to those skilled in the art, the above described example of this invention is embodied in a motor armature apparatus comprising, a plurality of substantially U-shaped insulated conductors substantially encapsulated within a composite core, wherein the composite core comprises a plurality of space-separated soft magnetic particles in a non-magnetic binder and wherein the apparatus also comprises an armature shaft having an axially linear portion encapsulated within the composite core.

EXAMPLE 3

Figure 4C:
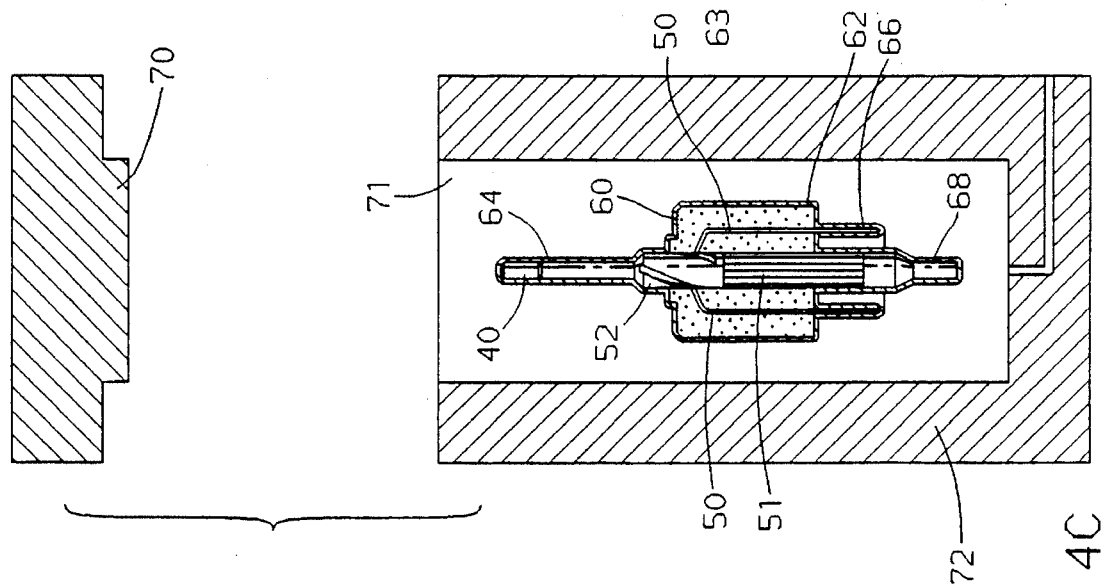
FIGS. 4a, 4b, 4c, 4d, 4e, 4f and 4g illustrate a third example method of constructing an armature according to this invention.
Figure 4B:
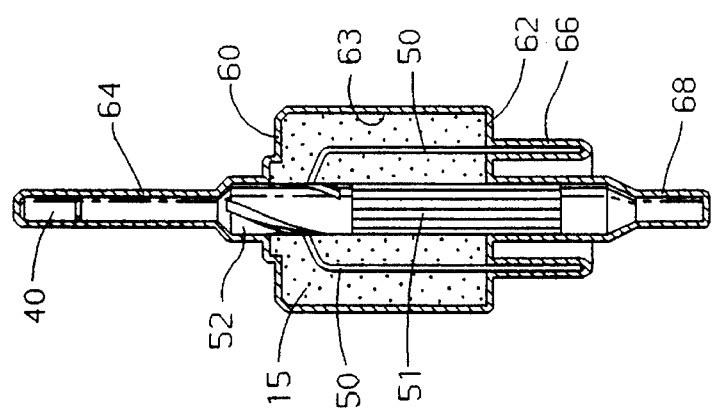
Figure 4A:
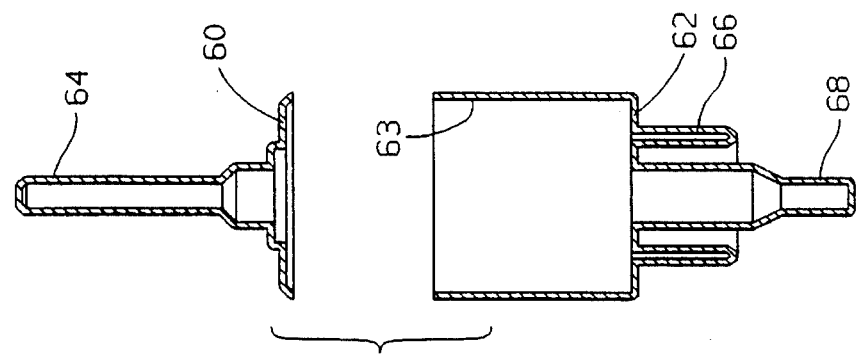

The armature of this invention may be compaction molded using an isostatic compaction process such as shown in FIGS. 4*a*–*g*. Referring to FIG. 4*a*, a two-piece container comprising lower portion 62 and upper portion 60 may, in one example, be fabricated from sheet metal. Other suitable materials may be used and it will be understood that this invention is not limited to the use of sheet metal in this process. Top portion 60 includes a receptacle 64 receiving the top portion of the armature shaft and lower portion 62 includes a receptacle 68 for receiving the lower portion of the armature shaft. The container lower portion 62 also defines a plurality of smaller cylindrically shaped receptacles 66, each having a closed lower end and an upper end opening into the chamber defined by body 63. The small cylindrically shaped receptacles 66 are radially spaced about the axis 61 of the container and adapted to receive and hold in place the armature conductors 50. The body 63 of the container will form the composite portion of the armature.

Referring to FIG. 4*b*, an armature shaft 52 is placed in the lower portion 62 of the container. A predetermined number of conductors 50 are then placed in the lower portion 62 of the container and are properly oriented and retained in place by receptacle 66. Next, a predetermined amount of composite powder 15 is placed in the lower container 62, filling the container. The particles may be added to the container using a vibratory powder feeder. The upper portion 60 of the container is then placed on the lower portion, which portions are sealed together during the application of isostatic pressure, described below, to form a single container 63 retaining the armature shaft 52, conductors 50 and composite powder 15.

Referring to FIG. 4*c*, the container 63 is then placed within an isostatic compaction chamber 71 formed in a chamber body 72 having a top 70 for sealing the chamber 71 and a hydraulic feed line 74 for receiving hydraulic fluid under pressure.

Figure 4D:
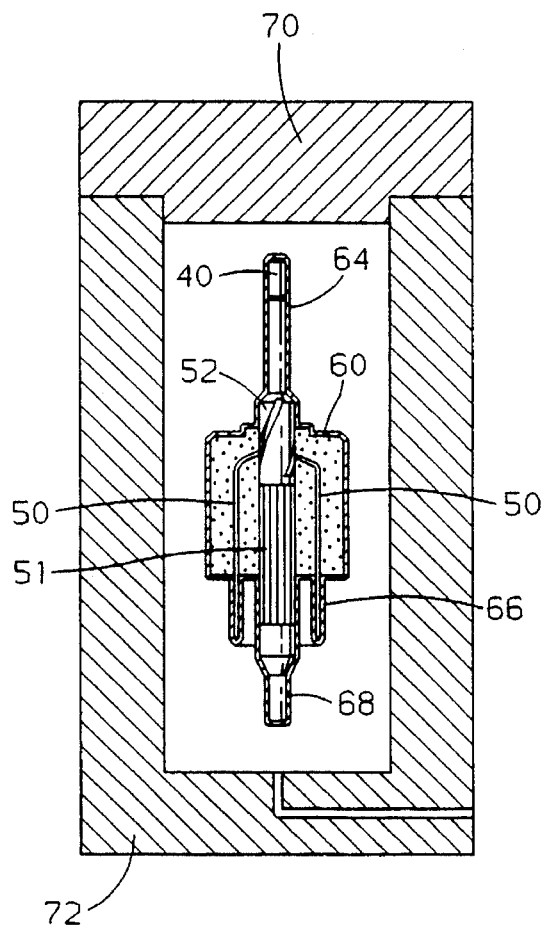

Referring now to FIG. 4*d*, after the container 63 is placed in the isostatic compaction chamber 71, the top of the isostatic compaction unit 70 is placed on the body 72 and sealed. Isostatic fluid 73 is then pumped into the chamber through hydraulic line 74.

Figure 4E:
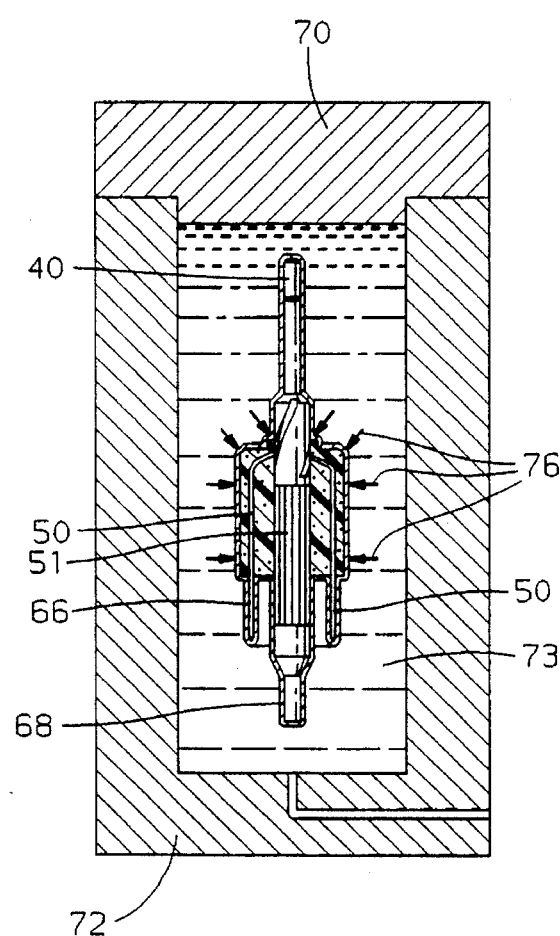

Referring now to FIG. 4*e*, the pressure chamber 71 is heated, through heating of the hydraulic fluid prior to its entrance into chamber 71 to a temperature sufficient to cause the non-magnetic binder of the composite powder 15 to at least partially flow. The hydraulic fluid 73 is pressurized to a pressure in the range of 30–55 tons p.s.i. When the fluid 73 is pressurized, the fluid applies pressure, as represented by arrows 76, on the container 63 normal to the container surfaces to affect the compaction molding of the armature within the container 63, molding the composite material around the armature shaft 52 and conductors 50.

Figure 4F:
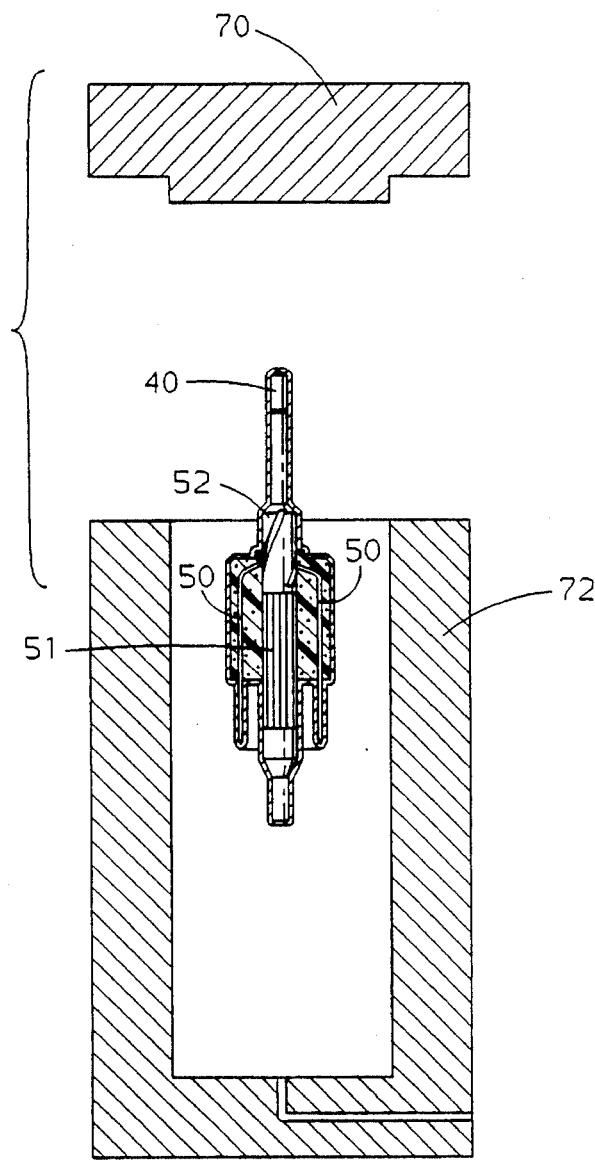

Referring now to FIG. 4*f*, after the compaction is completed for a time of up to 30 seconds at a temperature up to 650° F., or whatever temperature is suitable for the binder used, the hydraulic fluid is removed from the chamber 71 via line 74 and the top 70 of the chamber is removed so that the container 63 containing the compaction molded rotor may be removed.

Figure 4G:
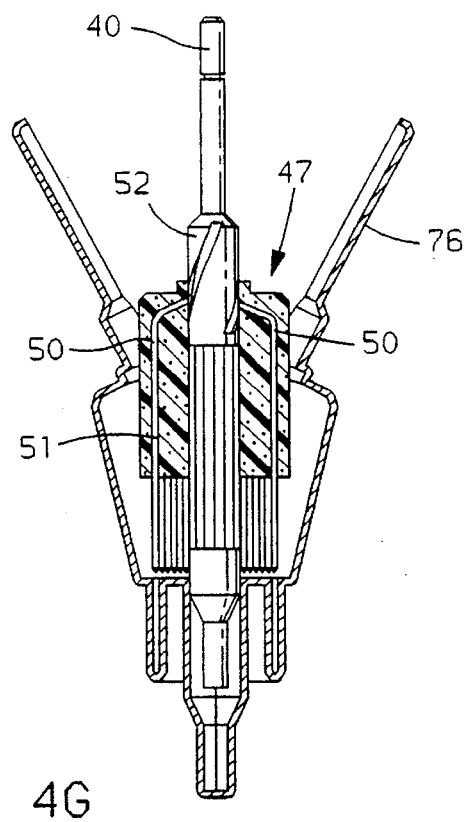

Referring now to FIG. 4*g*, the container is then opened destructively so that the resultant rotor 47 may be removed.

EXAMPLE 4

Figure 5:
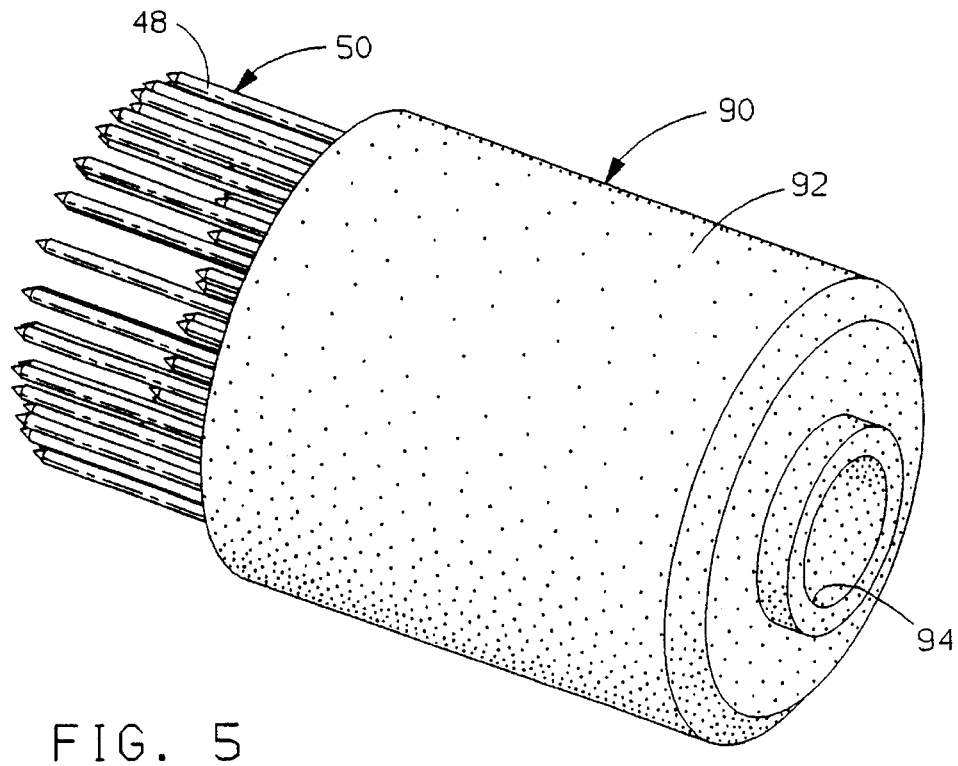
FIG. 5 illustrates another example armature according to this invention.

Referring now to FIG. 5, another example armature assembly according to this invention is shown. The armature assembly 90 shown includes a compaction molded body 92 containing a plurality of insulated conductors 50 whose ends 48 protrude from one of the cylinder ends of the body 92 and are adapted to be attached to a commutator in a manner well known to those skilled in the art. Armature assembly 90 varies from armature assembly 47, described above, in that no armature shaft is molded as part of the armature assembly. Instead, the armature assembly 90 is molded with a cylindrical axial opening 94 extending longitudinally completely through the body 92 of the armature assembly 90 and is adapted for receiving an armature shaft through a later step of assembly.

Armature assembly 90 is desirable when a single armature assembly may be suitable for use with two or more different armature shaft designs, as long as, each shaft design is able to mount the common armature assembly according to this invention.

Figure 6A:
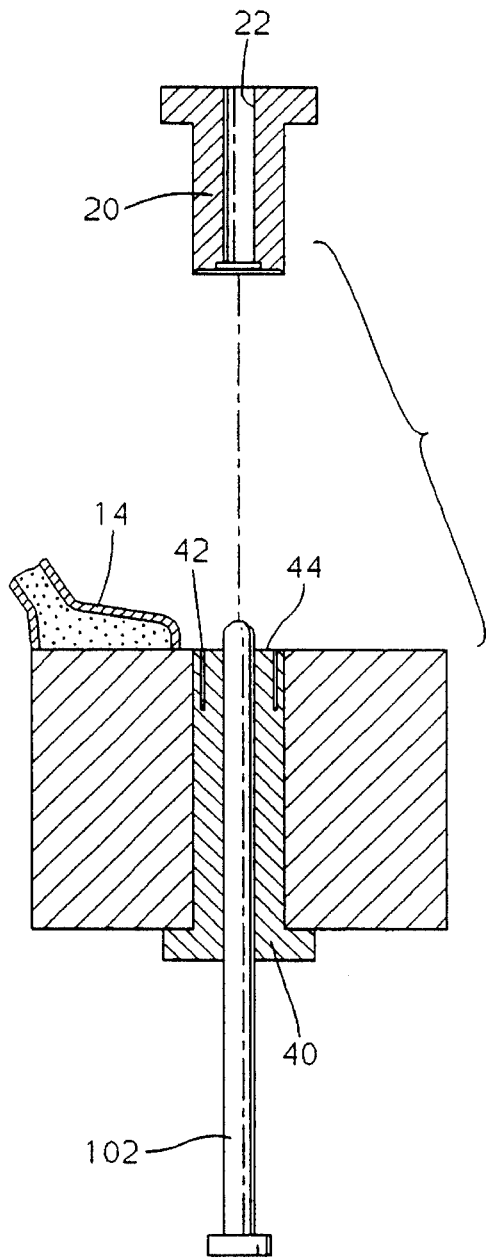
FIGS. 6a, 6b, 6c, 6d, 6e and 6f illustrate a fourth example method of constructing an armature assembly according to this invention.

Referring now to FIGS. 6a–f, an example method of constructing the armature assembly shown in FIG. 5 begins with the steps shown in FIG. 6a. The die body 10 has a cylindrical chamber within which is slidably engaged a lower punch 40. Lower punch 40 has an upper end 44 having a plurality of cylindrical receptacles 42 for retaining armature conductors in the manner described above. Lower punch 40 has a cylindrical axial bore within which core rod 102 is slidably engaged.

Figure 6B:
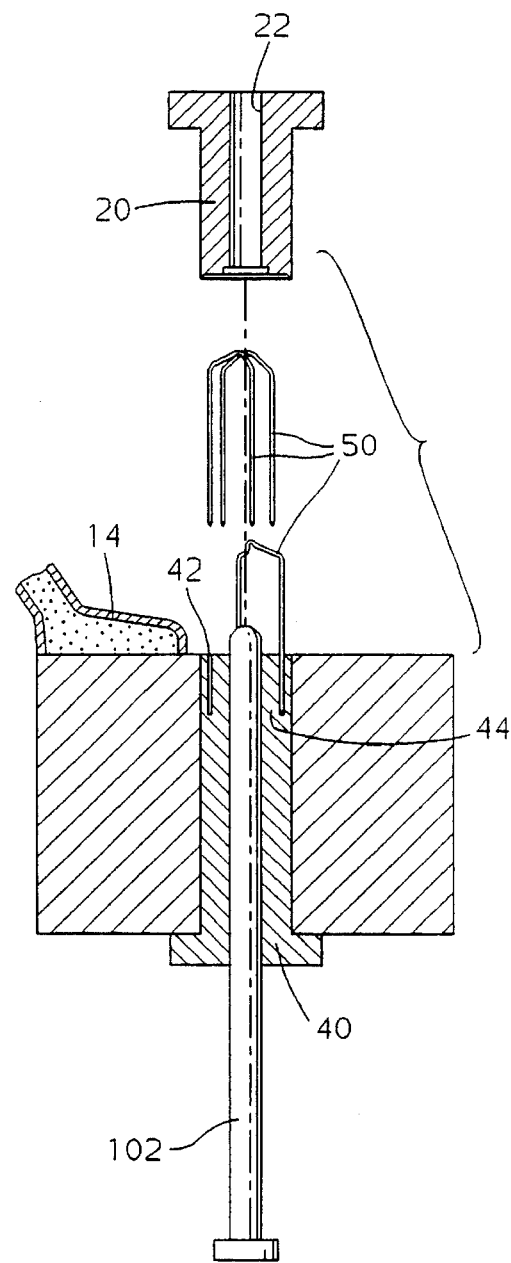

Referring to FIG. 6b, the conductors 50 are mounted within the receptacles 42 in the upper end 44 of lower punch 40.

Figures 6C, 6D:
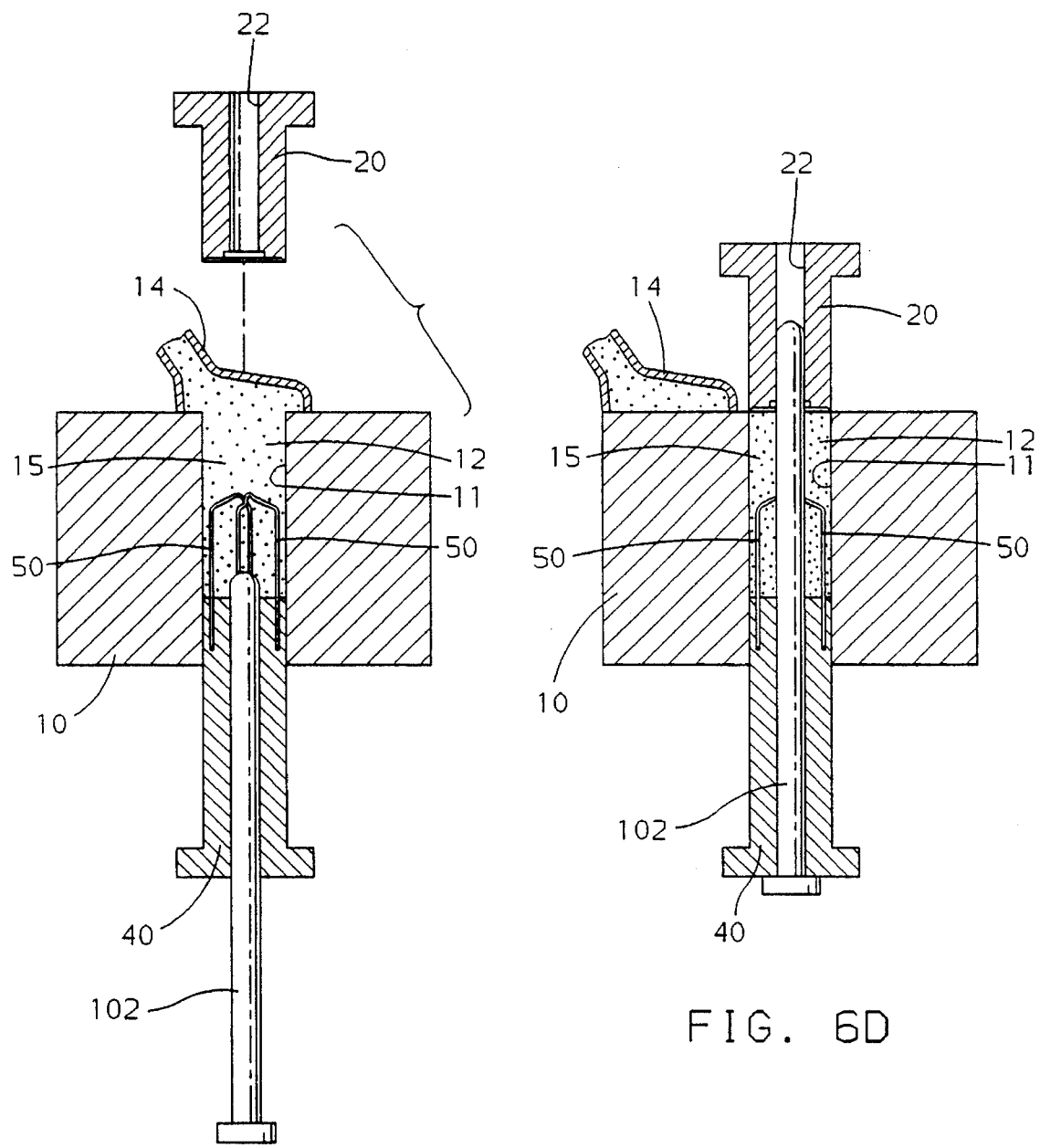

Referring to FIG. 6c, the lower punch 40 is then lowered and the feed shuttle 14 is slid over the top of chamber 12 to provide a predetermined amount of composite powder into the chamber 12.

Referring now to FIG. 6d, the feed shuttle 14 is then slid to its original non-feeding position so that it is sealed against the die body 10 and upper punch 20 is lowered into engagement with the wall 11 of cylindrical chamber 12.

Core rod 102 is then raised through the chamber 12 and into engagement with the axial bore 22 of upper punch 20. Core rod 102 prevents the central opening 94 of the core body from being filled, thus providing the opening into which an armature shaft can later be assembled.

Figure 6E:
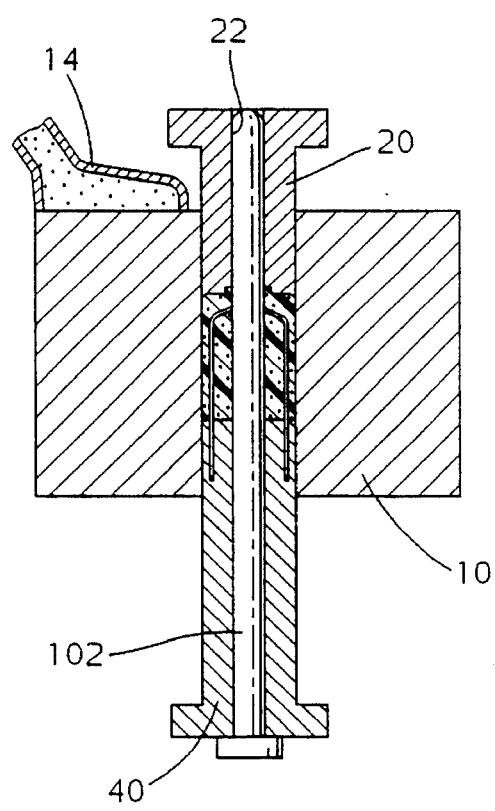
Figure 6F:
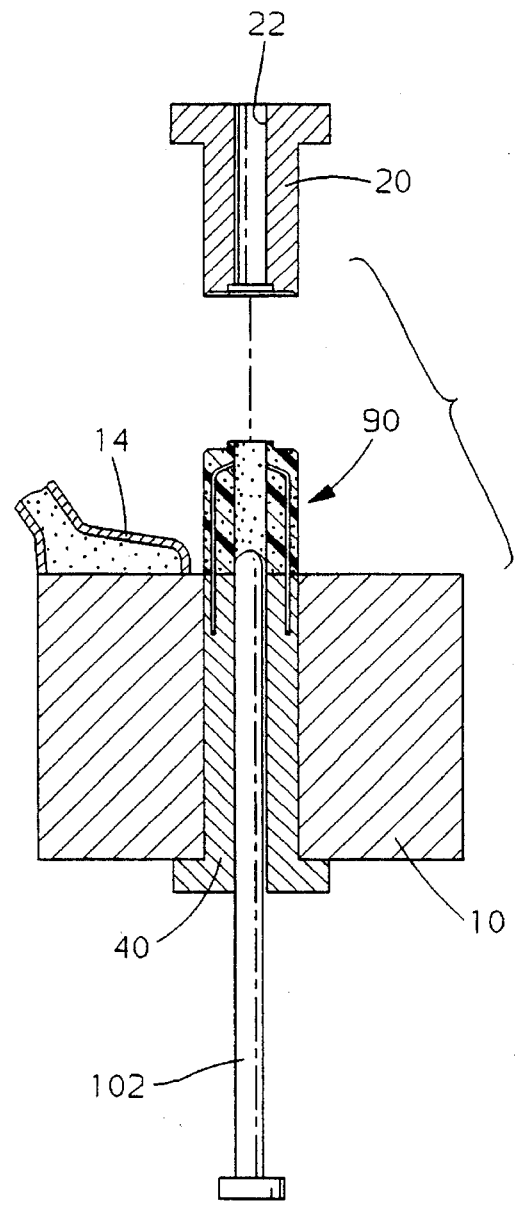

Referring now to FIG. 6e, the upper and lower punches are brought into position and pressure is applied thereto to effect the compaction molding of the powder 15 to form the core 46 while molding in place conductors 50. During the molding process, the die 10 is heated (or the die 10 may have been preheated) to a temperature up to 650° F. After the armature has been molded at a pressure in the range of 45–60 tons p.s.i. for a time up to 30 seconds, pressure is removed from the upper and lower punches 20 and 40 and the upper punch 20 is raised and cleared from the die body 10. The lower punch 40 is then raised to bring the armature assembly 90 to the top of die body 10 and out of engagement with core rod 102, allowing the armature assembly 90 to be removed wherein the result is shown in FIG. 5.

Thus it will be apparent to those skilled in the art that the above described example of this invention is embodied in an apparatus comprising a plurality of substantially U-shaped conductors substantially encapsulated within a composite core, wherein the composite core comprises a plurality of space-separated soft magnetic particles in a non-magnetic binder.

EXAMPLE 5

Referring now to FIGS. 7a–h, a method of compaction molding the armature assembly 90 shown in FIG. 5 through isostatic compaction molding is shown.

Figure 7A:
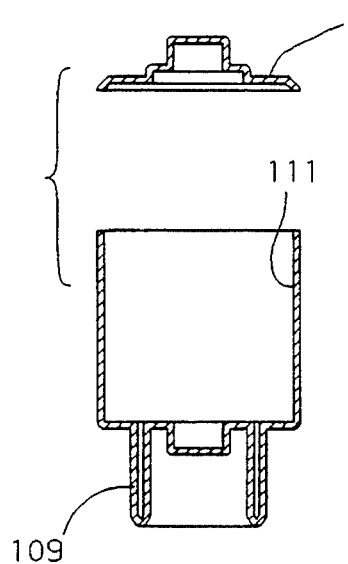
FIGS. 7a, 7b, 7c, 7d, 7e, 7f, 7g and 7h illustrate a fifth example method of constructing an armature assembly according to this invention.

Referring to FIG. 7a, the container having two parts 110, 112 is fabricated from a suitable material such as sheet metal. The container lower portion 112 has a body portion 111 within which the compaction powder is placed and within which the body of the armature assembly 90 is formed. Lower portion 112 includes a plurality of radially spaced receptacles 109 for spacing and retaining of the conductors 50.

Figure 7B:
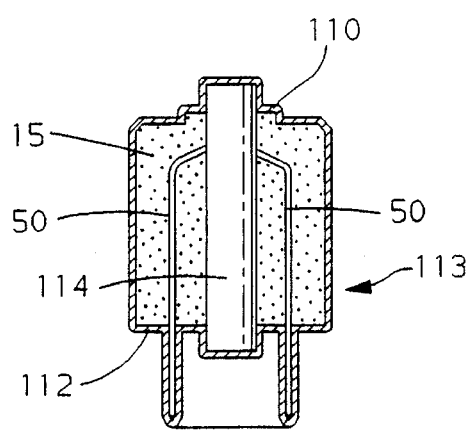

Referring now to FIG. 7b, the lower portion 112 of the container is loaded with a steel dummy core 114, a plurality of conductors 50 and a predetermined amount of compaction powder 15. The upper portion 110 is then placed over the lower portion 112 to form resultant container 113 containing the dummy core 114, compaction powder 15 and the prepositioned conductors 50.

Figure 7C:
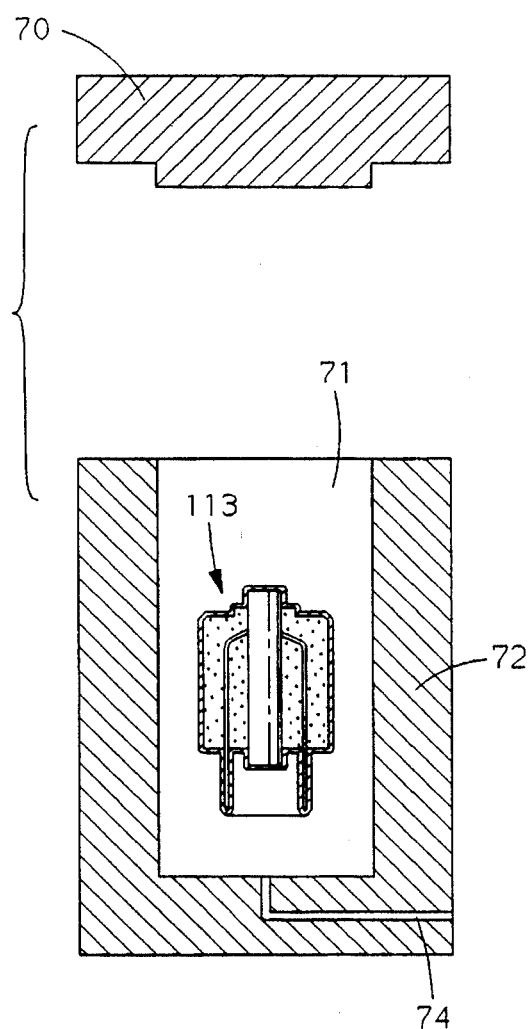

The container 113 is then lowered into the isostatic chamber 71 as shown in FIG. 7c.

Figure 7D:
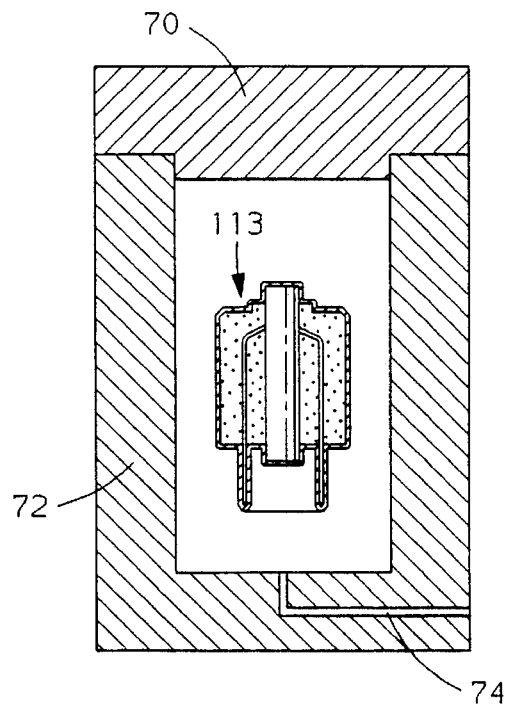

Referring to FIG. 7d, the top 70 is sealed to the body 72 of the isostatic chamber 71 and a fluid 73 is fed to the chamber 71 via hydraulic line 74.

Figure 7E:
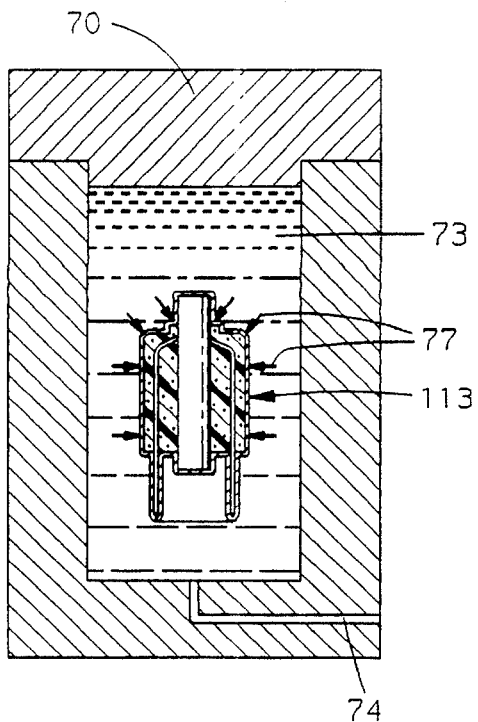

Referring to FIG. 7e, pressure is applied to the fluid via hydraulic line 74 so that the fluid 73 places isostatic pressure, represented by arrow 77, against the chamber 113 normal to all surfaces of the container 113. During the pressurization, the chamber 71 is heated via heating of the hydraulic fluid 73 before the fluid 73 enters the chamber 71. The temperature of the fluid may be up to 650° F. or another temperature, depending upon the type of binder used.

Figure 7F:
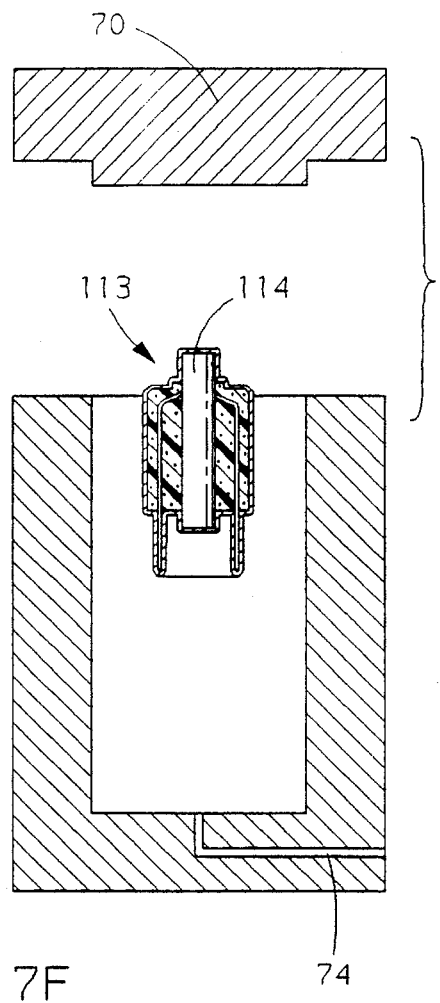
Figure 7G:
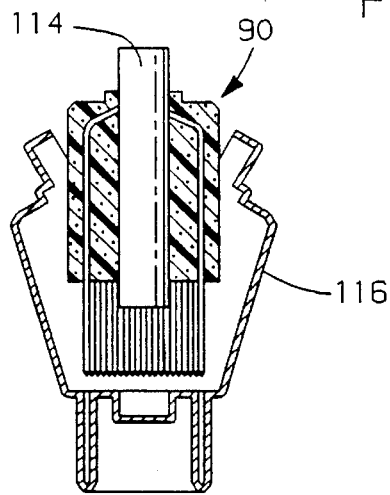
Figure 7H:
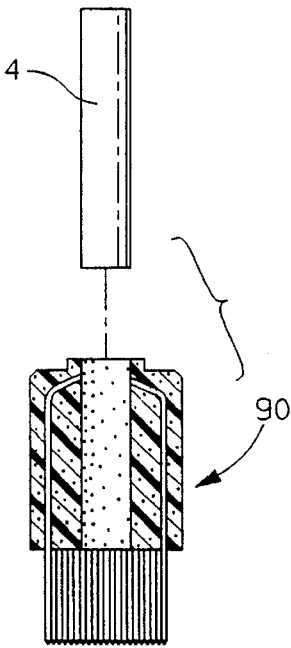

After the container 113 has been within the chamber 71 for up to 30 seconds at a pressure in the range of 30–55 tons p.s.i. while receiving heat from the fluid 73, the fluid is drained from the chamber 71 via line 74 and the top 70 is removed from the chamber as shown in FIG. 7f. The container 113 is then removed and is destructively opened, as shown in FIG. 7g, so that the armature assembly 90 is removed. Next, as shown in FIG. 7h, the dummy core 114 is removed from the armature assembly 90 to provide the resultant assembly 90 shown in FIG. 5.

EXAMPLE 6

Figure 8A:
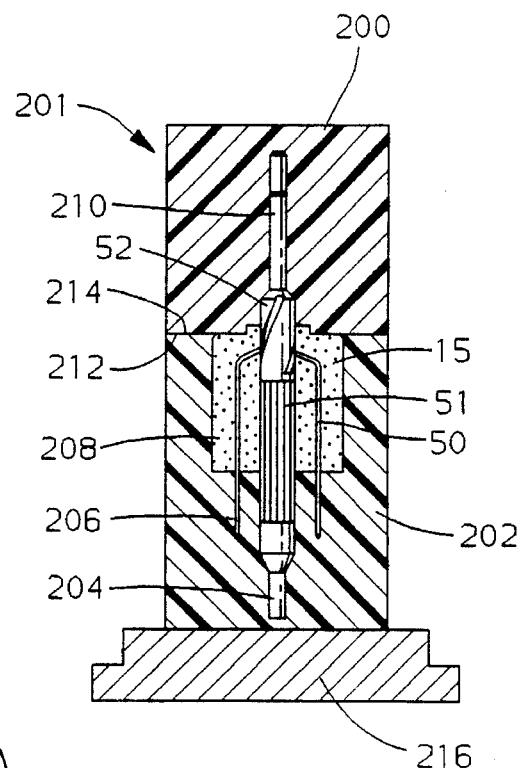
FIGS. 8a and 8b illustrate a sixth example method of constructing an armature assembly according to this invention.
Figure 8B:
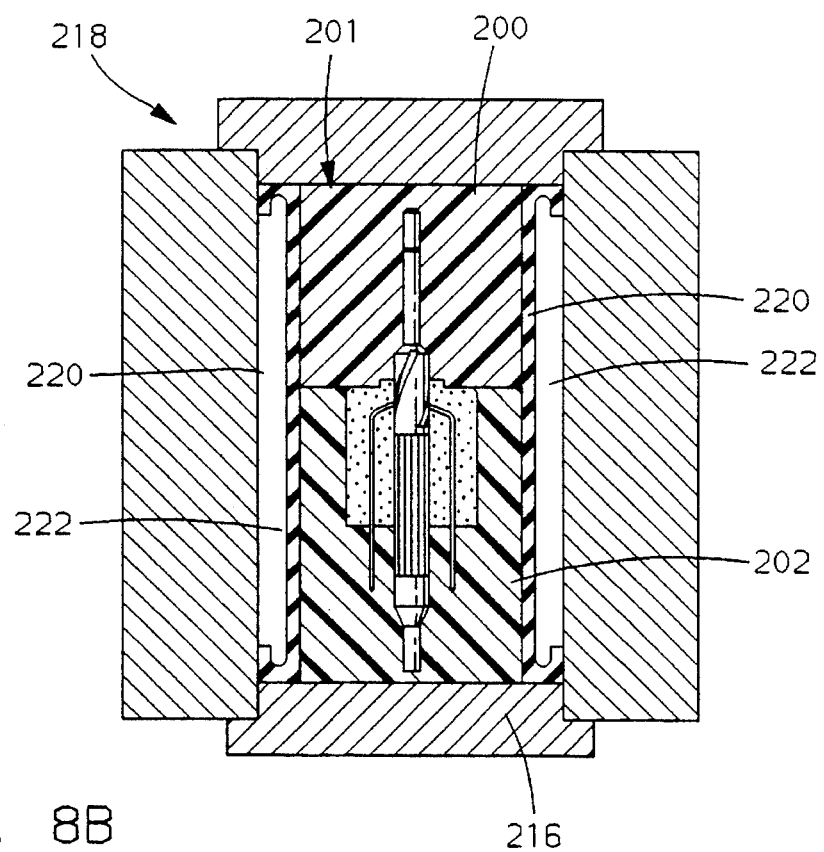

Referring now to FIGS. 8a and 8b, another example isostatic compaction method of manufacturing an armature assembly according to this invention is shown. FIG. 8a illustrates a steel base 216 on which is mounted lower polyurethane tooling 202. Lower polyurethane tooling 202 is generally cylindrical in shape, has a top edge 212 and defines a cavity 208 in which the particles 15 are to be added. The inner cavity of lower polyurethane tooling 202 also defines receptacle 204 for receiving and retaining in place one end of armature shaft 52. A series of elongated cylindrical receptacles 206 are radially placed circumscribing the receptacle 204. The receptacles 206 are spaced so as to properly locate insulated conductors 50 as described herein or in any other pattern that may be desired by a motor designer.

To prepare for the compaction molding, shaft 52 is loaded in receptacle 204 and conductors 50 are loaded in receptacles 206. Next, a predetermined quantity of particles 15 are placed in lower tooling 202 and upper polyurethane tooling 200, having receptacle 210 for receiving the second end of shaft 52, is place over shaft 52 and lower tooling 202. Upper and lower tooling 200 and 202 together form a container 201 within which are the particles 15, shaft 52 and conductors 50.

The container 201 is placed within isostatic chamber compaction mold machine 218 (FIG. 8b). Machine 218 forms a cylindrical chamber closed at one end and open at the other end. When the container 201 is placed within the cylindrical chamber through the open end, the steel base 16 acts as a wall of the cylindrical chamber to close the chamber. Machine 218 includes a means for applying force against the outer periphery of container 201 to heat and compaction mold the armature. For example, hydraulic fluid under pressure is provided to passage 222, applying the requisite pressure via polyurethane diaphragm 220. Pressure can also be applied from cylinder end 224. The pressure from the compaction molding retains surfaces 212 and 214 of upper and lower tooling 200 and 202 sealed during the molding process and is transferred through the polyurethane diaphragm and tooling to the particles 15. Heat for the compaction molding can be provided from a preheat of the tooling 200, 202 or from machine 18, including from the hydraulic fluid. An example compaction molding pressure is in the range from 30 to 55 tsi applied for up to 30 seconds.

After the compaction molding, hydraulic pressure behind diaphragm 220 is reduced and steel plate 216 and container 201 are removed from the machine 218. The upper and lower polyurethane tooling 200 and 202 are then separated and the resultant armature and shaft assembly (FIG. 2) is removed from the tooling.

Machines capable of performing the above described compaction molding using the polyurethane tooling 200, 202 are known to and commercially available to those skilled in the art and need not be set forth in more detail herein.

Figure 9:
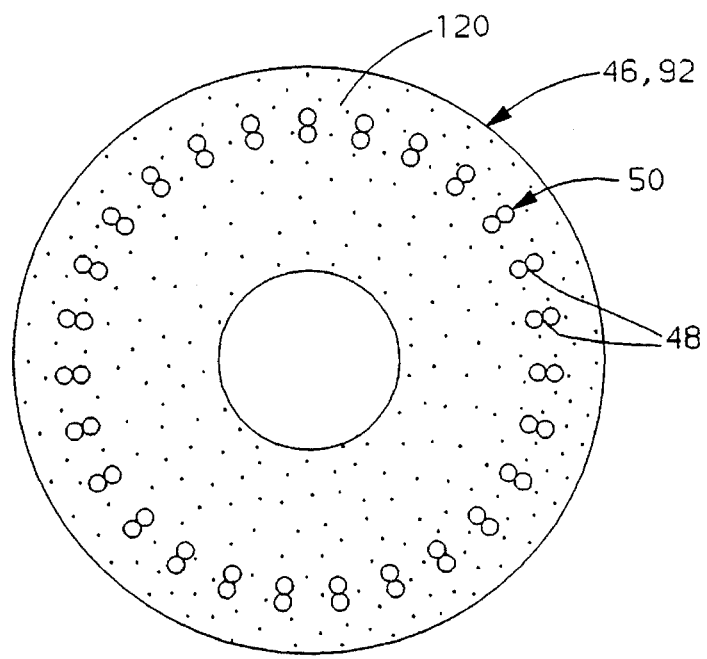
FIG. 9 illustrates an end view of an example armature according to this invention.

Referring now to FIG. 9, an end view of the armature assembly body 92 (or 19 or 46) provided by any of the above methods of this invention is shown with an example radial spacing of the conductors 50 having their ends 48 revealed and adapted for attachment to a commutator in a well known manner. As can be seen, in the example shown, conductors 50 are provided in pairs, which increases the current capacity of the armature.

The examples shown are for construction of a motor armature having a diameter in the range of 55–65 mm. The process parameters set forth, including the compaction pressure and the compaction time, may vary from implementation to implementation depending upon the size of the armature fabricated.

Referring now to FIGS. 10 and 11, an example conductor 50 is shown. The conductor 50 has two elongated portions 134 and a closed end 136 to form the substantially U-shape. At each end 148 there is a portion 132, approximately 10 mm. long, at which end portion 132 insulation is stripped from the conductor 50 to allow attachment to a commutator. Further, each end 148 terminates in a point 130 as shown.

The closed end 136 of the conductor includes three major bends, 138, 140 and 141, as shown.

Referring to FIG. 11, a profile view of the conductor shown in FIG. 10 illustrates the asymmetric shape of the insulated conductor 50, which aids in the positioning of several closely spaced conductors.

Referring now to FIG. 12, an example map for the spacing of the conductors and mapping of the commutator is shown and can be readily utilized by one skilled in the art to guide the spacing and wiring of the conductors and commutator. The conductors 50 are spaced so that the resultant armature encapsulates a predetermined number, m, of conductors. The m conductors are radially spaced about the axis of the armature and are preferably positioned so that each conductor, x, substantially overlaps the preceding conductor, x−1, and is substantially overlapped by the succeeding conductor, x+1. The mth conductor is substantially overlapped by the 1st conductor. In most implementations, each conductor will partially overlap n other conductors, each to a different degree, where n is less than m and greater than 1. The variables n and m will vary from implementation to implementation as motor performance requirements vary and can be easily determined by those skilled in the art.

The completion of the electric motor, including the armature of this invention, which involves the steps of assembling the commutator and placing the motor armature within the motor housing, are easily achieved by those skilled in the art and need not be set forth in further detail herein. When operating a motor implementing the armature of this invention, the motor rpm limit may be set by the strength of the armature core according to this invention to retain its structurally integrity against forces created by motor rotation. The actual rpm limit will vary from implementation to implementation as the armature shape and size varies.

As will be appreciated by those skilled in the art, the above described methods of manufacture of this invention are embodied by the process comprising the steps of (a) retaining a plurality of armature conductors 50 pre-positioned in a pre-mold position; (b) placing the armature conductors in a mold (FIG. 3, references 10, 20 and 40); (c) adding to the mold a predetermined quantity of soft-magnetic particles (FIG. 3, reference 15), each soft-magnetic particle coated with a non-magnetic material, wherein said particles surround at least a portion of each of the conductors; (d) applying pressure to the mold to affect a compaction molding of the coated soft magnetic particles into a composite structure, wherein the particles and the non-magnetic material form a composite structure armature core substantially encapsulating the conductors within the armature core. Further, with respect to FIGS. 2, 3a–f and 4a–g, the method of this invention additionally comprises the step of prepositioning an armature shaft 52 in a pre-mold position, wherein the armature core encapsulates an axially linear portion of the armature shaft 52 as shown in FIG. 2.

The above-described implementations of this invention are example implementations. Moreover, various other improvements and modifications to this invention may occur to those skilled in the art and will fall within the scope of this invention as set forth below.

The embodiments of the invention in which an exclusive property or privilege is claimed are defined as follows:

1. A motor armature comprising: an armature shaft:
   an annular cylindrical body having a radially interior substantially circular cylindrical surface engaging the armature shaft and a radially exterior circular cylindrical surface, wherein the annular cylindrical body comprises a plurality of space-separated soft magnetic particles in a non-magnetic binder;
   a plurality of substantially U-shaped conductors, each substantially U-shaped conductor having a majority of a body thereof located in and suspended by the annular cylindrical body, wherein each substantially U-shaped conductor is entirely located radially interior of the radially exterior circular cylindrical surface and radially exterior of the radially interior circular cylindrical surface.

2. The motor armature set forth in claim 1 wherein the annular cylindrical body has a first axial end and a second axial end, wherein each substantially U-shaped conductor has first and second extending leads extending in an axial direction from the first axial end.

3. A motor armature comprising a plurality of substantially U-shaped conductors substantially encapsulated within an annular cylindrical body having a radially interior substantially circular cylindrical surface engaging an armature shaft and a radially exterior circular cylindrical surface, wherein the annular cylindrical body comprises a plurality of space-separated soft magnetic particles in a non-magnetic binder, wherein each substantially U-shaped conductor is substantially located in and suspended by the annular cylindrical body, wherein each substantially U-shaped conductor is entirely located radially interior of the radially exterior circular cylindrical surface and radially exterior of the radially interior circular cylindrical surface.

4. The motor armature set forth in claim 3, wherein the armature shaft has an axially linear portion encapsulated within the annular cylindrical body.

5. The motor armature set forth in claim 3, wherein the annular cylindrical body has a first axial end and a second axial end, wherein each substantially U-shaped conductor has first and second extending leads extending in an axial direction from the first axial end.

6. The motor armature set forth in claim 2, wherein each substantially U-shaped conductor has a closed end located within the annular cylindrical body between the first and second axial ends.

7. The motor armature set forth in claim 2, wherein each substantially U-shaped conductor has a closed end located exterior of the annular cylindrical body, extending from the second axial end.

8. The motor armature set forth in claim 5, wherein each substantially U-shaped conductor has a closed end located within the annular cylindrical body between the first and second axial ends.

9. The motor armature set forth in claim 5, wherein each substantially U-shaped conductor has a closed end located exterior of the annular cylindrical body, extending from the second axial end.

* * * * *